(12) United States Patent
Hisadomi et al.

(10) Patent No.: US 8,448,802 B2
(45) Date of Patent: May 28, 2013

(54) FUEL TANK STRUCTURE

(75) Inventors: Masaru Hisadomi, Wako (JP); Hiroshi Yamada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/241,395

(22) Filed: Sep. 23, 2011

(65) Prior Publication Data

US 2012/0074139 A1 Mar. 29, 2012

(30) Foreign Application Priority Data

Sep. 24, 2010 (JP) ................................. 2010-213587

(51) Int. Cl.
  *B65D 90/28* (2006.01)
  *B65D 90/22* (2006.01)
(52) U.S. Cl.
  USPC ......................................... 220/88.2; 220/86.2
(58) Field of Classification Search
  USPC ............. 220/88.2, 88.1, 86.2, 86.1, 293, 288,
         220/562, 563, 254.5, 254.3, 254.1, 323, 320,
                   220/319, 315, 200; 180/9.25
  IPC .................. B65D 90/22,49/08, 90/28
  See application file for complete search history.

(56) References Cited

U.S. PATENT DOCUMENTS

| | | | | |
|---|---|---|---|---|
| 1,068,193 A * | 7/1913 | Weil | ............................... | 220/89.2 |
| 1,203,797 A * | 11/1916 | Sexton | ..................... | 220/203.07 |
| 1,814,656 A * | 7/1931 | Anschicks | .................... | 220/86.1 |
| 2,244,947 A * | 6/1941 | Hargiss | ............................ | 141/96 |
| 3,465,911 A * | 9/1969 | Colarusso et al. | ............ | 220/86.1 |
| 5,439,129 A * | 8/1995 | Buechler | ....................... | 220/86.2 |
| 6,315,144 B1 * | 11/2001 | Foltz | ............................. | 220/86.2 |
| 2008/0237230 A1 * | 10/2008 | Och | .............................. | 220/86.2 |

FOREIGN PATENT DOCUMENTS

| | | |
|---|---|---|
| JP | 2005-047334 | 2/2005 |
| JP | 2009-101855 | 5/2009 |

* cited by examiner

*Primary Examiner* — Mickey Yu
*Assistant Examiner* — Robert J Hicks
(74) *Attorney, Agent, or Firm* — Rankin, Hill & Clark LLP

(57) ABSTRACT

A fuel tank structure including a fuel tank, a fuel filler port device formed in a cylindrical shape and arranged in the fuel tank, and a flame arrester arranged in the fuel filler port device and disposed inside the fuel tank. A fuel bleeding opening is formed in a peripheral wall part of the fuel filler port device and an arrester peripheral wall part. A cylindrical ring disposed so as to urge itself against the peripheral wall part and block the fuel bleeding opening.

20 Claims, 14 Drawing Sheets

FUEL TANK STRUCTURE

BACKGROUND OF THE INVENTION

1. Field of the Invention

The present invention generally relates to a fuel tank structure equipped with a flame arrester and, more particularly, to a fuel bleed opening and to a structure for closing the fuel bleed opening.

2. Description of Related Art

In a fuel tank of a motorcycle it is known to provide a wire-netting style flame arrester inside a fuel filler port of a fuel tank to prevent invasion of a fire source into the fuel tank while allowing the fuel to be fed through the fuel filler port. See, for example, JP-A No. 2009-101855. It is also known, in a fuel tank of a saddle-ride type vehicle, to insert a fuel bleeding pipe through a fuel filler port to bleed the fuel inside the fuel tank. In this regard see, for example, JP-A No. 2005-47334.

However, when a flame arrester is provided in a fuel filler port of a fuel tank as described in JP-A No. 2009-101855, even if the fuel is to be bled using a fuel bleeding pipe as described in JP-A No. 2005-47334, the flame arrester becomes an obstacle, so that the fuel bleeding pipe cannot be inserted to the bottom of the fuel tank, and therefore the fuel cannot be bled. Also, in order to allow the fuel bleeding pipe to reach the bottom of the fuel tank, it may be possible to arrange an opening through which the fuel bleeding pipe is inserted in the flame arrester; however, in this case, in order to secure the function of the flame arrester, the opening is required to be blocked after the fuel has been bled, which presents problems that the structure becomes complicated and the work requires man-hours. Therefore, there exists a need in the art for a fuel tank structure allowing bleeding of fuel through the fuel filler port.

SUMMARY OF THE INVENTION

The present invention is directed toward a fuel tank structure allowing bleeding of the fuel through the fuel filler port with a simple structure that facilitates the work.

The fuel tank structure according to the present invention includes a fuel tank, a fuel filler port formed in a cylindrical shape and arranged in the fuel tank, and a flame arrester arranged in the fuel filler port and disposed inside the fuel tank. An opening is formed in a side face part of the fuel filler port, and a cylindrical spring sheet member is disposed so as to urge itself against the side face part of the fuel filler port to block the opening.

According to the present invention, even when the flame arrester is disposed inside the fuel tank, the fuel inside the fuel tank can be bled using the opening arranged in the side face part of the cylindrical fuel filler port, and the opening can be blocked by the cylindrical spring sheet member arranged so as to urge itself against the side surface part. Thus, a fuel tank structure capable of bleeding the fuel through the fuel filler port can be achieved with a simple structure, the opening can be blocked by the cylindrical spring sheet member, and the work of blocking the opening can be facilitated.

In further accordance with the present invention, a fuel cap engaged so as to block the fuel filler port is included, and a fuel cap engaging part formed in the fuel filler port is formed so as to extend into the fuel tank and the fuel cap engaging part positions the cylindrical spring sheet member in the axial direction. Since the cylindrical spring sheet member is positioned by the fuel cap engaging part formed in the fuel filler port, the cylindrical spring sheet member can be provided without increasing the number of components.

In further accordance with the present invention, an inward folded part is formed at a lower end of a cylindrical part constituting the fuel filler port, and the inward folded part positions the cylindrical spring sheet member in the axial direction. The strength of the lower end side of the fuel filler port can be enhanced by the inward folded part formed at the lower end of the fuel filler port, and the cylindrical spring sheet member can be positioned in the axial direction by the inward folded part; therefore the number of components can be reduced and the productivity can be improved.

In further accordance with the present invention, a gun stopper body for restricting insertion of a nozzle in feeding fuel may be arranged below a lower end of the fuel filler port. As such, dropping of the cylindrical spring sheet member can be restricted by the gun stopper body in assembling the cylindrical spring sheet member, and the productivity can be improved.

Further, the fuel filler port includes a filler metal member exposed toward outside the fuel tank and formed in a cylindrical shape and having a cylindrical gun stopper member arranged inside the filler metal member. The gun stopper member includes, at the bottom, a gun stopper formed so as to extend across a bottom open face, the opening is formed in a cylindrical side face of the gun stopper member, folded parts are formed at the top and bottom positions of the cylindrical side face, and the cylindrical spring sheet member is positioned in the axial direction by the folded parts. Since the cylindrical spring sheet member is positioned in the axial direction by the folded parts formed at the top and bottom positions of the cylindrical side face of the gun stopper member, the cylindrical spring sheet member can be arranged without increasing the number of components. Also, because the gun stopper member is arranged separately from the filler metal member, the productivity improves.

In further accordance with the present invention, the upper folded part formed in the gun stopper member may be further provided with a folding back part formed thereon. Since the folding back part is formed in the upper folded part formed in the gun stopper member, catching of the nozzle by the upper folded part in feeding the fuel can be prevented by the folding back part, and workability can be improved.

In further accordance with the present invention, the cylindrical spring sheet member may be set on an inner periphery of a cylindrical assembling member whose diameter is formed smaller than that of the cylindrical spring sheet member when urging itself inside and against the cylindrical side part of the fuel filler port, and the cylindrical spring sheet member may be inserted into the fuel filler port while being guided by an inner periphery of the cylindrical assembling member connected to the fuel filler port. Since the cylindrical spring sheet member is inserted into the fuel filler port while being guided by the inner periphery of the cylindrical assembling member connected to the fuel filler port, the workability of assembling can be improved.

In further accordance with the present invention, the cylindrical spring sheet member may be arranged above the flame arrester. In this case, since the cylindrical spring sheet member is arranged above the flame arrester, the cylindrical spring sheet can be arranged without blocking the flame arrester.

The present invention offers several advantages. For example, in the fuel tank structure according to the present invention, the fuel inside the fuel tank can be bled using the opening arranged in the side face part of the fuel filler port, and the opening can be blocked by the cylindrical spring sheet member arranged so as to urge itself against the side face part.

Thus, a fuel tank structure capable of bleeding the fuel through the fuel filler port can be achieved with a simple structure, the opening can be blocked by the cylindrical spring sheet member, and the work of blocking the opening can be facilitated. Also, since the cylindrical spring sheet member is positioned by the fuel cap engaging part, the cylindrical spring sheet member can be provided without increasing the number of components.

In addition, the strength of the lower end side of the fuel filler port can be enhanced by the inward folded part of the fuel filler port, and the cylindrical spring sheet member can be positioned in the axial direction by the inward folded part; therefore the number of components can be reduced and the productivity can be improved.

Further, dropping of the cylindrical spring sheet member can be restricted by the gun stopper body in assembling the cylindrical spring sheet member, and the productivity can be improved.

Furthermore, since the cylindrical spring sheet member is positioned in the axial direction by the folded parts formed at the top and bottom positions of the gun stopper member, the cylindrical spring sheet member can be arranged without increasing the number of components. Also, since the gun stopper member is arranged separately from the filler metal member, the productivity improves.

Also, catching of the nozzle by the upper folded part in feeding the fuel can be prevented by the folding back part of the gun stopper member, and the workability can be improved.

Further, since the cylindrical spring sheet member is inserted into the fuel filler port while being guided by the inner periphery of the cylindrical assembling member, the workability of assembling can be improved.

Furthermore, the cylindrical spring sheet can be arranged without blocking the flame arrester.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Figure 1:
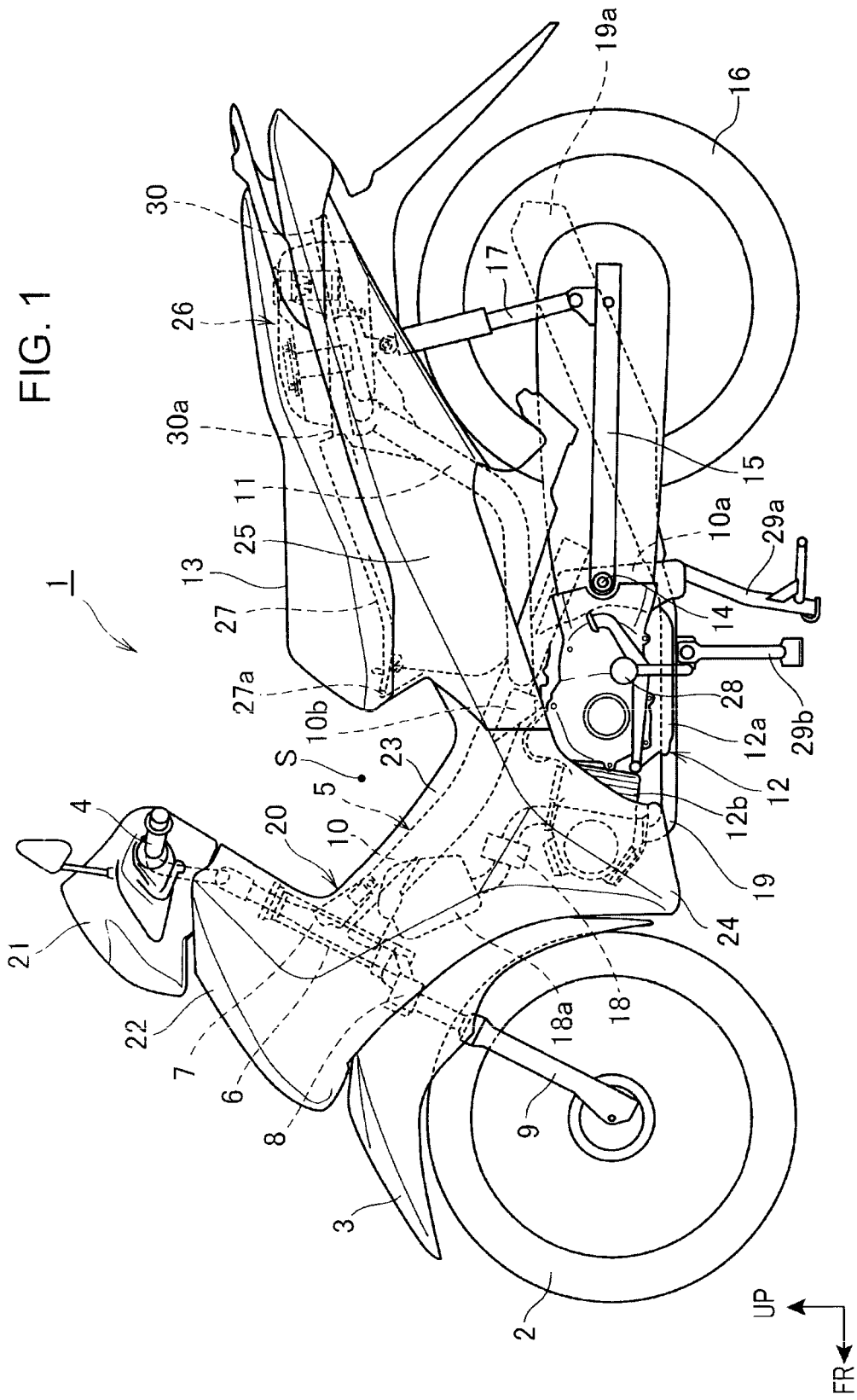
FIG. 1 is a left side view of a motorcycle to which is applied a fuel tank structure according to the first embodiment of the present invention.

Below, the fuel tank structure of a saddle-ride type vehicle according to each embodiment of the present invention will be described referring to the drawings. Also, unless described otherwise, the direction such as front/rear, right/left and the like in the description below is the same as the direction in a vehicle described below. Further, in appropriate positions in the drawings used for the description below, an arrow FR representing the forward direction of the vehicle, an arrow LH representing the left-hand direction of the vehicle, and an arrow UP representing the upward direction of the vehicle are shown.

FIG. 1 is a left side view of a motorcycle to which is applied a fuel tank structure according to the first embodiment of the present invention.

A front wheel 2 is rotatably arranged in the front part of a motorcycle 1 (saddle-ride type vehicle), and a front fender 3 is arranged above the front wheel 2. A bar handle 4 for steering the front wheel 2 is arranged above the front fender 3. A steering stem 7 is rotatably supported by a head pipe 6 formed at the front end of a vehicle body frame 5, and the bar handle 4 is arranged on the top of the steering stem 7.

A sheet-like lower bridge 8 extending to the right and left is arranged at the bottom of the steering stem 7, the upper ends of right and left front forks 9 are fixed to the right and left ends of the lower bridge 8, and the front wheel 2 is rotatably supported by the bottom parts of the front forks 9.

The vehicle body frame 5 includes a main frame 10 constructed of one steel pipe material with a rectangular cross section extending obliquely downward to the rear from the head pipe 6, a seat rail 11 branched to the right and left from the rear end of the main frame 10, extended generally horizontally to the rear, then extended obliquely upward to the rear, and thereafter extended generally horizontally to the rear, and a pivot plate 10a extended downward from the rear end of the main frame 10.

An air-cooled single cylinder engine 12 is supported in the front of the pivot plate 10a and below a rear part of the main frame 10. A seat 13 on which occupants are seated is disposed above the seat rail 11, and rear covers 25 covering the periphery of the seat rail 11 are arranged below the seat 13. The seat 13 is long to the front and rear, the front upper surface of the seat 13 is a seating surface for a rider, whereas the rear upper surface is a seating surface for a pillion passenger.

The engine 12 is disposed in a state a crankshaft (not shown) is directed in the vehicle width direction. From the front end of a crankcase 12a of the engine 12, a cylinder 12b projects frontward in a generally horizontal state. The rear part of the crankcase 12a is supported by the pivot plate 10a, whereas the upper part of the crankcase 12a is supported by an engine hanger 10b extending from the main frame 10.

In the motorcycle 1, a straddling space S allowing the driver to straddle in sitting on the seat 13 is formed in front of the seat 13 and above the main frame 10, or more precisely, between the seat 13 and the head pipe 6, above the main frame 10 and above a main frame cover 23. Steps 28 on which the driver seated on the seat 13 places the feet are supported by the lower parts of the crankcase 12a. A main stand 29a for supporting the vehicle body in a standing state is supported by the lower end of the pivot plate 10a in a retractable manner. A side stand 29b for supporting the motorcycle 1 in a state the vehicle body is standing tilting to the left is supported in a retractable manner by the lower surface of the crankcase 12*a* near the base end of the step 28 and to the left of the vehicle body center line CL (refer to FIG. 3, FIG. 4 and the like) of the motorcycle 1.

By the pivot plate 10*a*, a pivot shaft 14 supporting the front ends of swing arms 15 is supported, and the swing arms 15 are supported so as to swing up and down around the pivot shaft 14. A rear wheel 16 is supported by rear ends of the swing arms 15. Rear cushions 17 are interposingly furnished between the rear parts of the swing arms 15 and the seat rail 11.

The downstream side of a throttle body 18 is connected to the upper part of the cylinder 12*b* of the engine 12, and an air cleaner box 18*a* is connected to the upstream side of the throttle body 18. An exhaust pipe 19 is led out from the bottom of the cylinder 12*b*, curvedly extends to the rear, and is connected to a silencer 19*a* arranged upward to the rear on the right side of the rear wheel 16.

A vehicle body cover 20 of the motorcycle 1 is composed of a plurality of resin-made covers. More specifically, the vehicle body cover 20 includes a handlebar cover 21 covering the middle of the bar handle 4, a front cover 22 covering the front of the head pipe 6 below the handlebar cover 21, a main frame cover 23 connected to the rear end of the front cover 22 and mainly surrounding the main frame 10, lower covers 24 connected to the lower ends of the front cover 22 and the main frame cover 23 and covering the sides of the cylinder 12*b* of the engine 12, and the rear covers 25 connected to the rear ends of the main frame cover 23 and the lower covers 24 and covering the parts below the seat 13.

The front and rear ends of a fuel tank 26 are each supported by a rearward extended part 30 of the rear part of the seat rail 11. The rear end of an article storage box 27 disposed below the front part of the seat 13 is supported by the front end 30*a* of the rearward extended part 30 along with the front end of the fuel tank 26. The front end of the seat 13 is supported by the front end of the article storage box 27 through a pivot shaft 27*a* extending in the vehicle width direction. By upward and downward pivotal movement of the seat 13 around the pivot shaft 27*a*, access to the article storage box 27 and the fuel tank 26 is allowed.

Figure 2:
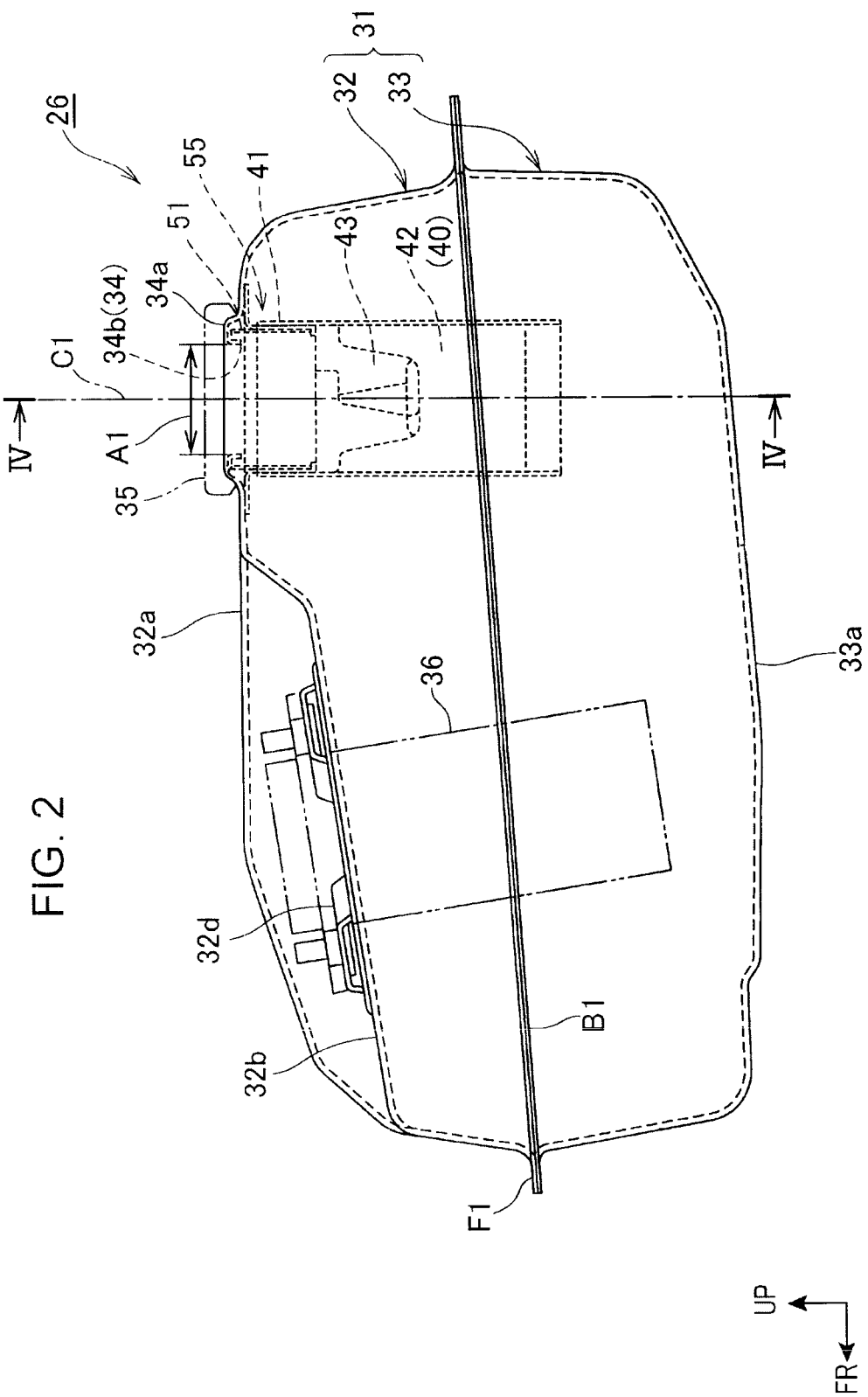
FIG. 2 is a left side view of a fuel tank.
Figure 3:
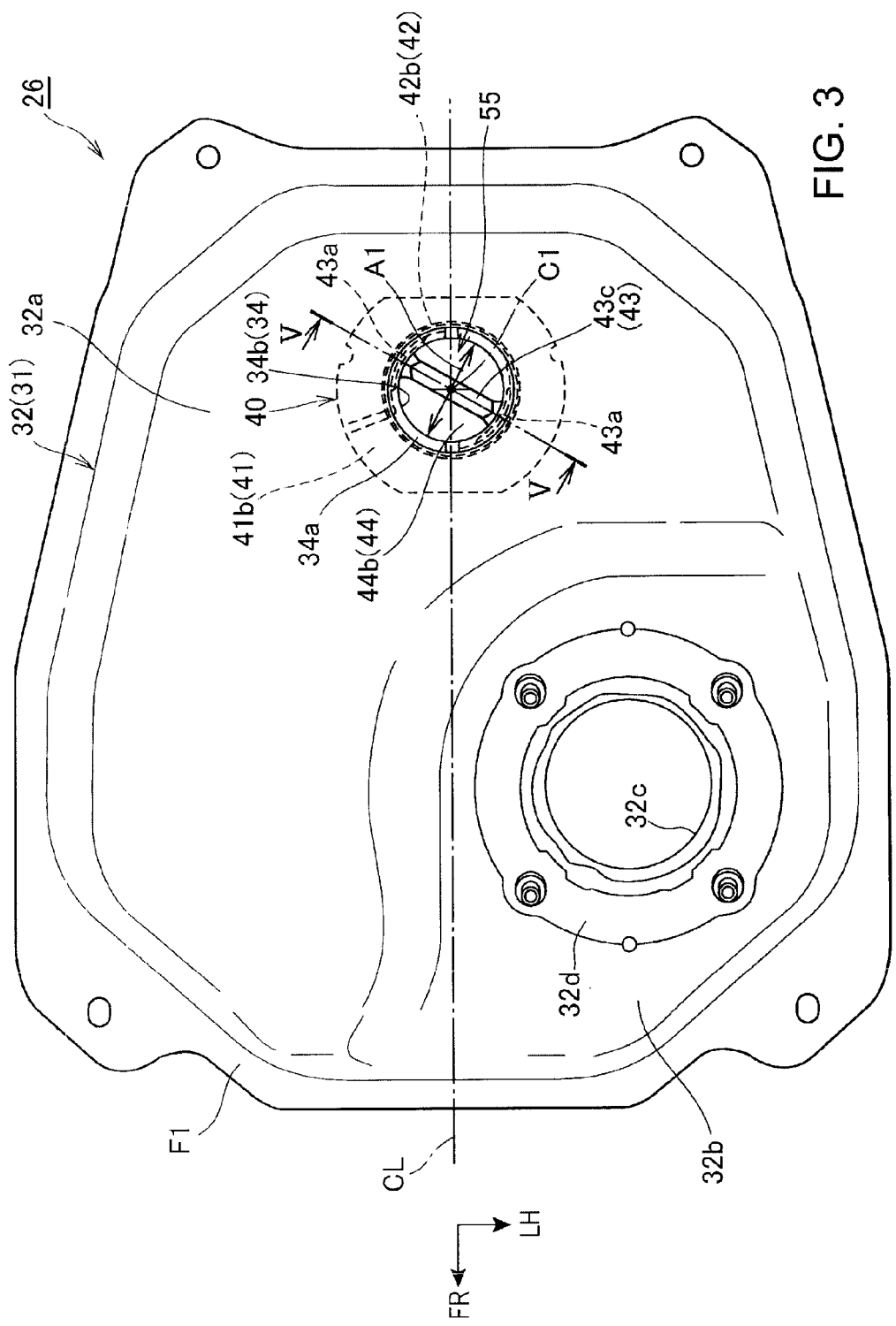
FIG. 3 is a plan view of a fuel tank as viewed from above.

FIG. 2 is a left side view of the fuel tank 26. FIG. 3 is a plan view of the fuel tank 26 as viewed from above.

With reference to FIG. 2 and FIG. 3, the fuel tank 26 includes a hollow tank body 31 in a generally rectangular parallelepiped shape in which upper and lower split bodies 32, 33 are joined integrally on a generally horizontal splitting plane B1. The upper split body 32 has a container shape opening downward, whereas the lower split body 33 has a container shape opening upward. The upper and lower split bodies 32, 33 are press-molded products, and a downward open end of the upper split body 32 and an upward open end of the lower split body 33 are welded integrally through a flange F1 running along the splitting plane B1.

In the rear part of a generally horizontal upper wall part 32*a* in the upper split body 32 of the tank body 31, a fuel feeding opening 34 communicating with the inside of the tank body 31 and having a circular shape in the top view is formed. The fuel feeding opening 34 is arranged in the center of the upper wall part 32*a* in the vehicle width direction, and is blocked by a detachable fuel filler port cap 35 (fuel cap).

In the front left side of the upper wall part 32*a*, a left front flat part 32*b* changed downwardly in level in a step shape and slightly inclining downward to the front is formed. An opening 32*c* is formed in the left front flat part 32*b*, and a bracket 32*d* is fixed to the periphery of the opening 32*c* from above. A fuel pump 36 for supplying the fuel inside the tank body 31 to the engine 12 is provided, through the bracket 32*d*, in a state facing the inside of the tank body 31.

Here, the motorcycle 1 is a vehicle also capable of using ethanol-containing fuel as the fuel for the engine 12, and the ethanol-containing fuel is stored in the fuel tank 26. In the fuel feeding opening 34 of the fuel tank 26, a fuel filler port device 40 formed into a cylindrical shape and extending to the inside of the fuel tank 26 is arranged.

Figure 4:
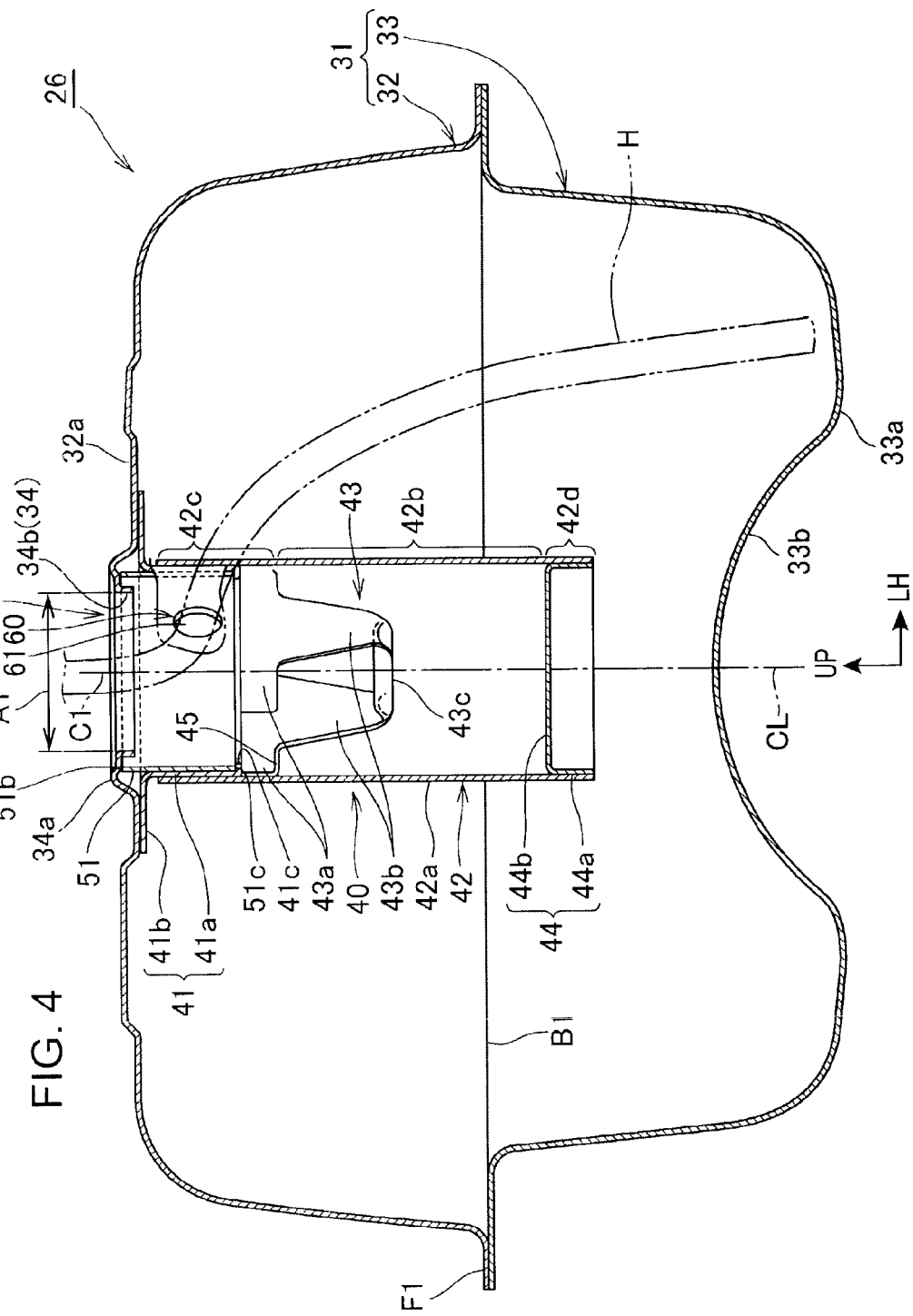
FIG. 4 is a cross-sectional view taken from line IV-IV in FIG. 2.
Figure 5:
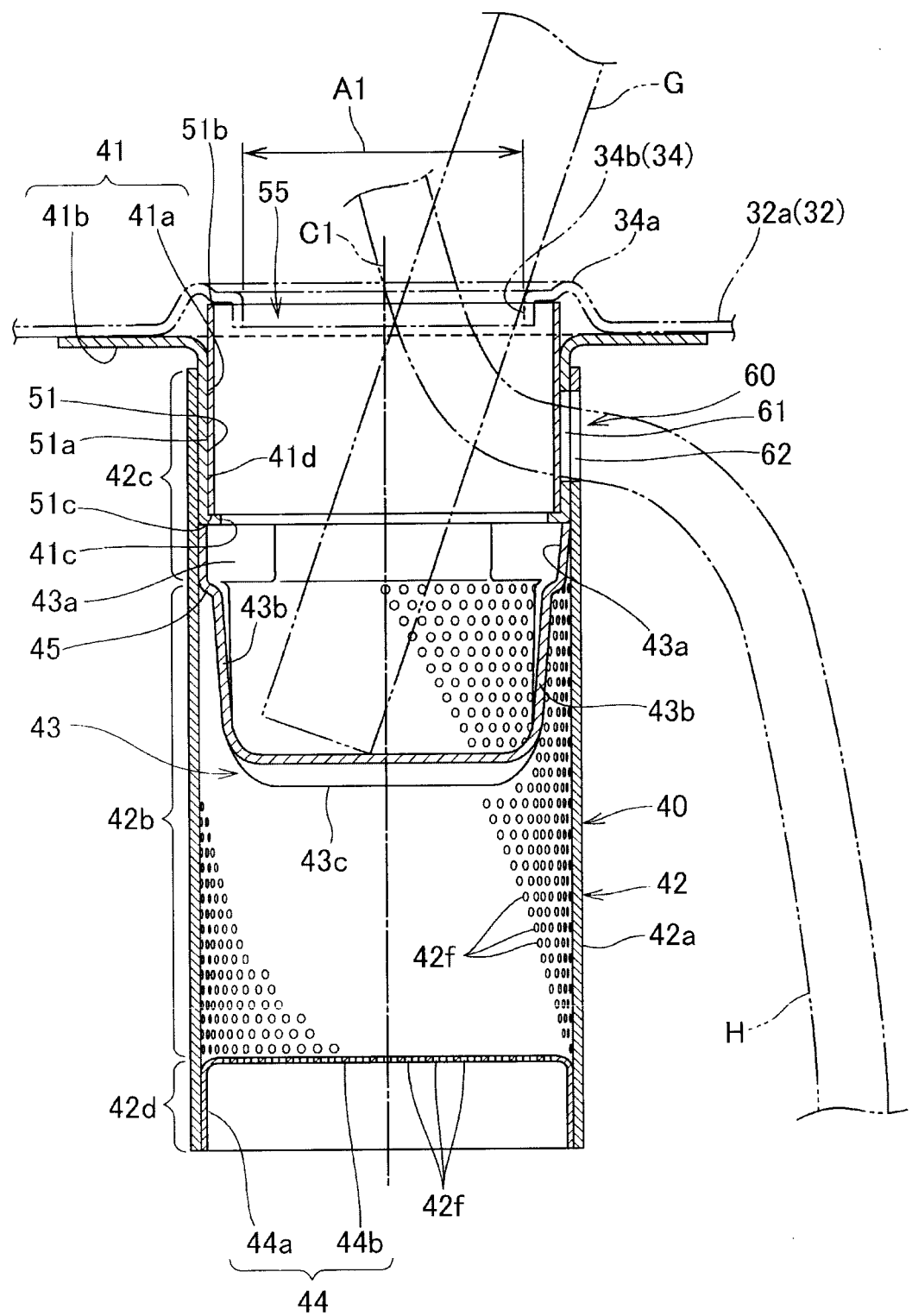
FIG. 5 is a cross-sectional view taken from line V-V in FIG. 3.

FIG. 4 is a cross-sectional view taken from line IV-IV in FIG. 2. FIG. 5 is a cross-sectional view taken from line V-V in FIG. 3.

As shown in FIG. 4 and FIG. 5, the fuel filler port device 40 is configured to include a fuel feed guiding cylinder 41 (tube part) as a fuel filler port continuing to the lower part of the fuel feeding opening 34 and extending to the inside of the tank body 31, a cylindrical flame arrester 42 arranged so as to cover the lower opening part of the fuel feed guiding cylinder 41, a gun stopper body 43 arranged inside the flame arrester 42 and restricting the insertion amount of a nozzle G of a fuel feed gun, and a cylindrical ring 51 (cylindrical spring sheet member) engaging with an inner peripheral surface 41*d* of the fuel feed guiding cylinder 41.

In the center of a lower wall part 33*a* of the tank body 31 in the vehicle width direction, a recess 33*b* (refer to FIG. 4) securing an upward swinging range of the rear wheel 16 positioned below the lower wall part 33*a* is formed.

In the peripheral part of the fuel feeding opening 34, an upward projected annular frame part 34*a* (engaging part for the fuel cap) is formed. The fuel filler port cap 35 is engaged with the frame part 34*a*. The frame part 34*a* and the fuel feed guiding cylinder 41 constitute a fuel filler port 55 through which the nozzle G is inserted.

The frame part 34*a* is shaped into a chevron shape cross section by folding the sheet of the upper wall part 32*a*, and extends around the entire circumference of the fuel feeding opening 34. The frame part 34*a* includes a cylindrical inner peripheral wall part 34*b* formed by folding back downward, and the inner peripheral wall part 34*b* extends downward and toward the inside of the tank body 31 along the fuel filler port axial line C1 extending generally in the vertical direction.

The inside diameter of the inner peripheral wall part 34*b* becomes the inside diameter of the fuel feeding opening 34. In FIG. 4, the diameter of the fuel feeding opening 34 as viewed in the axial direction is represented by a reference sign A1.

The fuel feed guiding cylinder 41 includes a peripheral wall part 41*a* (side surface part) coaxial with the fuel feeding opening 34 and of a cylindrical shape, and a flange part 41*b* formed at and around the upper end of the peripheral wall part 41*a*. The flange part 41*b* abuts on the flat part of the upper wall part 32*a* on the outer peripheral side of the frame part 34*a* from below and inside the tank body 31, and is joined with the upper wall part 32*a* integrally by welding and the like.

Also, in the peripheral wall part 41*a*, an inward folded part 41*c* is formed by bending the lower end of the peripheral wall part 41*a* inward in the axial direction. The inward folded part 41*c* is formed so that the inside diameter thereof becomes larger than the diameter A1 of the fuel feeding opening 34.

The flame arrester 42 includes a cylindrical arrester peripheral wall part 42*a* and a cap member 44 blocking a lower end opening of the arrester peripheral wall part 42*a*. The flame arrester 42 is joined with the fuel feed guiding cylinder 41 by that the inner peripheral surface of an upper part 42*c* of the arrester peripheral wall part 42*a* is fitted to the outer peripheral surface of the peripheral wall part 41*a* of the fuel feed guiding cylinder 41 and is welded in the state. The flame arrester 42 is formed long in the vertical direction, and the lower end of the arrester peripheral wall part 42*a* and the cap member 44 are positioned below the splitting plane B1.

The arrester peripheral wall part 42*a* includes a mesh part 42*b* obtained by forming a number of communication holes 42*f* in a steel sheet, for example. Here, the arrester peripheral wall part 42*a* is configured by forming a sheet of so-called perforated metal formed with a number of small holes in a steel sheet into a cylindrical shape.

Also, the cap member 44 is arranged by forming a sheet of perforated metal into a bottomed cylindrical shape which opens downward and is comparatively shallow in the vertical direction. A number of communication holes 42*f* are formed in a peripheral wall part 44*a* and a bottom wall part 44*b* of the cap member 44, and the cap member 44 is formed in a mesh configuration. In the cap member 44, the peripheral wall part 44*a* is welded and fixed to a lower part 42*d* of the flame arrester 42.

Thus, in the flame arrester 42, the arrester peripheral wall part 42*a* and the cap member 44 have a number of communication holes 42*f* and are formed in a mesh configuration, the fuel is allowed to circulate to the inside of the tank body 31 and the air inside the tank body 31 is discharged to the outside by passing through these communication holes 42*f*. Also, when a fire source enters through the fuel feeding opening 34 the fire source can be caught by the flame arrester 42, and invasion of the fire source to the inside of the tank body 31 can be prevented. Further, because the flame arrester 42 is constructed not of a wire mesh sheet but of a perforated metal sheet, the strength and heat resistance of the flame arrester 42 can be improved.

The gun stopper body 43 is arranged below the fuel feed guiding cylinder 41, restricts the insertion amount of the nozzle G of the fuel feed gun into the tank body 31, and prevents the nozzle G from contacting the flame arrester 42. The gun stopper body 43 includes integrally a pair of joining sheet parts 43*a* curving along the inner peripheral surface of the upper part 42*c* of the flame arrester 42, a pair of supporting arm parts 43*b* extending downward from the respective joining sheet parts 43*a*, and a spanning part 43*c* extended between the lower ends of the pair of supporting arm parts 43*b*.

The pair of joining sheet parts 43*a* are formed into a generally rectangular sheet shape, and are made a flat shape without a hole. Each joining sheet part 43*a* is welded to the inner peripheral surface of the upper part 42*c* in a state its longitudinal direction is directed to the peripheral direction of the upper part 42*c* and the upper edge abuts on the lower surface of the inward folded part 41*c* of the fuel feed guiding cylinder 41.

As shown in FIG. 3 and FIG. 4, one of the joining sheet parts 43*a* is positioned obliquely to the left in the front of the flame arrester 42, whereas the other is positioned obliquely to the right in the rear of the flame arrester 42. That is, the pair of joining sheet parts 43*a* are opposed to each other in the radial direction of the flame arrester 42.

The pair of supporting arm parts 43*b* extend in a belt shape downward from the lower edge of the corresponding joining sheet parts 43*a*, and are formed like tapers with the width being narrowed as they go to the lower side. In the boundary between the joining sheet part 43*a* and the supporting arm part 43*b*, a step part 45 projected to the inside in the radial direction is formed, and the supporting arm part 43*b* continuing to the step part 45 extends downward to the vertical middle part of the flame arrester 42 in a state departing from the mesh part 42*b* of the flame arrester 42. Also, the pair of supporting arm parts 43*b* are inclined so as to approach the fuel filler port axial line C1 as they go to the lower side, and the distance between the supporting arm parts 43*b* narrows as it goes to the lower side.

As shown in FIG. 3 to FIG. 5, the spanning part 43*c* is formed in a bar shape so as to extend across the inside of the flame arrester 42 along the diameter of the flame arrester 42, and extends linearly having a chevron shape cross section projected upward. In feeding the fuel, the insertion amount of the nozzle G into the tank body 31 is restricted by abutting of the tip of the nozzle G on the spanning part 43*c*.

The outer peripheral surface of the gun stopper body 43 is surrounded by the arrester peripheral wall part 42*a* over the entire periphery. The nozzle G is prevented from contacting the mesh part 42*b* of the flame arrester 42 by abutting of the spanning part 43*c* and the supporting arm part 43*b* on the nozzle G.

As shown in FIG. 4 and FIG. 5, in the fuel filler port device 40, a fuel bleeding opening 60 (opening) is formed to allow a fuel bleeding hose H for bleeding the fuel stored inside the tank body 31 to pass to the inside of the tank body 31.

The fuel bleeding opening 60 is arranged above one of the joining sheet parts 43*a*, that is, above the joining sheet part 43*a* positioned obliquely to the left in the front of the flame arrester 42. More specifically, the fuel bleeding opening 60 is composed of a guide cylinder opening 61 passing through the peripheral wall part 41*a* of the fuel feed guiding cylinder 41 and an arrester opening 62 passing through the side face of the upper part 42*c* of the flame arrester 42. The guide cylinder opening 61 and the arrester opening 62 are openings of a generally circular shape, and the flame arrester 42 is welded to the fuel feed guiding cylinder 41 in a layout allowing the guide cylinder opening 61 and the arrester opening 62 to communicate and to be coaxial with each other.

After the bleeding work for the fuel by the fuel bleeding hose H, the fuel bleeding opening 60 is blocked by the cylindrical ring 51. The cylindrical ring 51 is formed by bending a belt-like steel sheet into a cylindrical shape, and is formed into a generally C shape having an open end in the peripheral direction. That is, the cylindrical ring 51 elastically deflects by application of a force in the direction reducing in diameter to the outer peripheral surface, and reduces in diameter with the distance of the open ends being narrowed.

The cylindrical ring 51 is arranged in a state in which its outer peripheral surface 51*a* fits the inner peripheral surface 41*d* of the peripheral wall part 41*a*, and blocks the fuel bleeding opening 60 from the inner periphery side. The cylindrical ring 51 is fitted to the inner peripheral surface 41*d* in a state reduced in diameter more than that of a natural state without application of any external force, and the inner peripheral surface 41*d* is urged so as to pressingly expand the inner peripheral surface 41*d* by a reaction force of the cylindrical ring 51.

According to the present first embodiment, since the fuel bleeding opening 60 is blocked by the cylindrical ring 51 arranged so as to urge itself against the inner peripheral surface 41*d*, the fuel bleeding opening 60 can be blocked with a simple structure without using any fastening member and the like, and the work of blocking the fuel bleeding opening 60 can be facilitated. In contrast, when the fuel bleeding opening 60 is to be blocked using the fastening member and a sheet material for blocking the fuel bleeding opening 60, for example, a space for inserting a tool for fastening needs to be secured and a part to be fastened such as a thread needs to be formed around the fuel bleeding opening 60, whereby the structure becomes complicated and the blocking work needs man-hours.

The cylindrical ring 51 is fitted between the frame part 34a of the fuel feeding opening 34 and the inward folded part 41c of the fuel feed guiding cylinder 41. More specifically, in the cylindrical ring 51, a ring upper end 51b abuts on the inner surface of the frame part 34a, and a ring lower end 51c abuts on the upper surface of the inward folded part 41c. That is, the cylindrical ring 51 is positioned in the axial direction by the frame part 34a and the inward folded part 41c.

Thus, the cylindrical ring 51 is arranged so as to urge itself against the inner peripheral surface 41d, is positioned in the axial direction by the frame part 34a and the inward folded part 41c, and is securely attached to the fuel feed guiding cylinder 41; therefore the play of the cylindrical ring 51 due to the vibration and the like of the motorcycle 1 is prevented, and generation of the sound is prevented.

Next, the work of bleeding the fuel using the fuel bleeding hose H and the work of blocking the fuel bleeding opening 60 by the cylindrical ring 51 will be described.

After completion of the complete inspection and the like of the motorcycle 1, the work of bleeding a small amount of the fuel supplied to the fuel tank 26 for a test operation of the engine 12 from inside the tank body 31 is conducted.

First, a worker makes the motorcycle 1 supported by the side stand 29b, passes the fuel bleeding hose H connected to a fuel suction device (not shown) into the fuel bleeding opening 60 positioned obliquely to the left in the front of the fuel feed guiding cylinder 41 through the fuel filler port 55 as shown in FIG. 4 and FIG. 5, and makes the lower end of the fuel bleeding hose H reach the inside bottom of the tank body 31 toward the left side face thereof.

Thereafter, the worker can bleed the fuel by activating a fuel suction device. After bleeding, the fuel bleeding hose H is removed from the tank body 31 by pulling the fuel bleeding hose H. At this time, since the motorcycle 1 is supported by the side stand 29b arranged on the left side of the vehicle body, the fuel is stored on the left side in the inside of the fuel tank 26, and the fuel can be bled efficiently by making the fuel bleeding hose H reach the bottom toward the left side face. That is, by forming the fuel bleeding opening 60 on the same side as the side stand 29b, the fuel bleeding hose H is allowed to reach the side where the fuel is stored, and the fuel can be bled efficiently.

Figure 6:
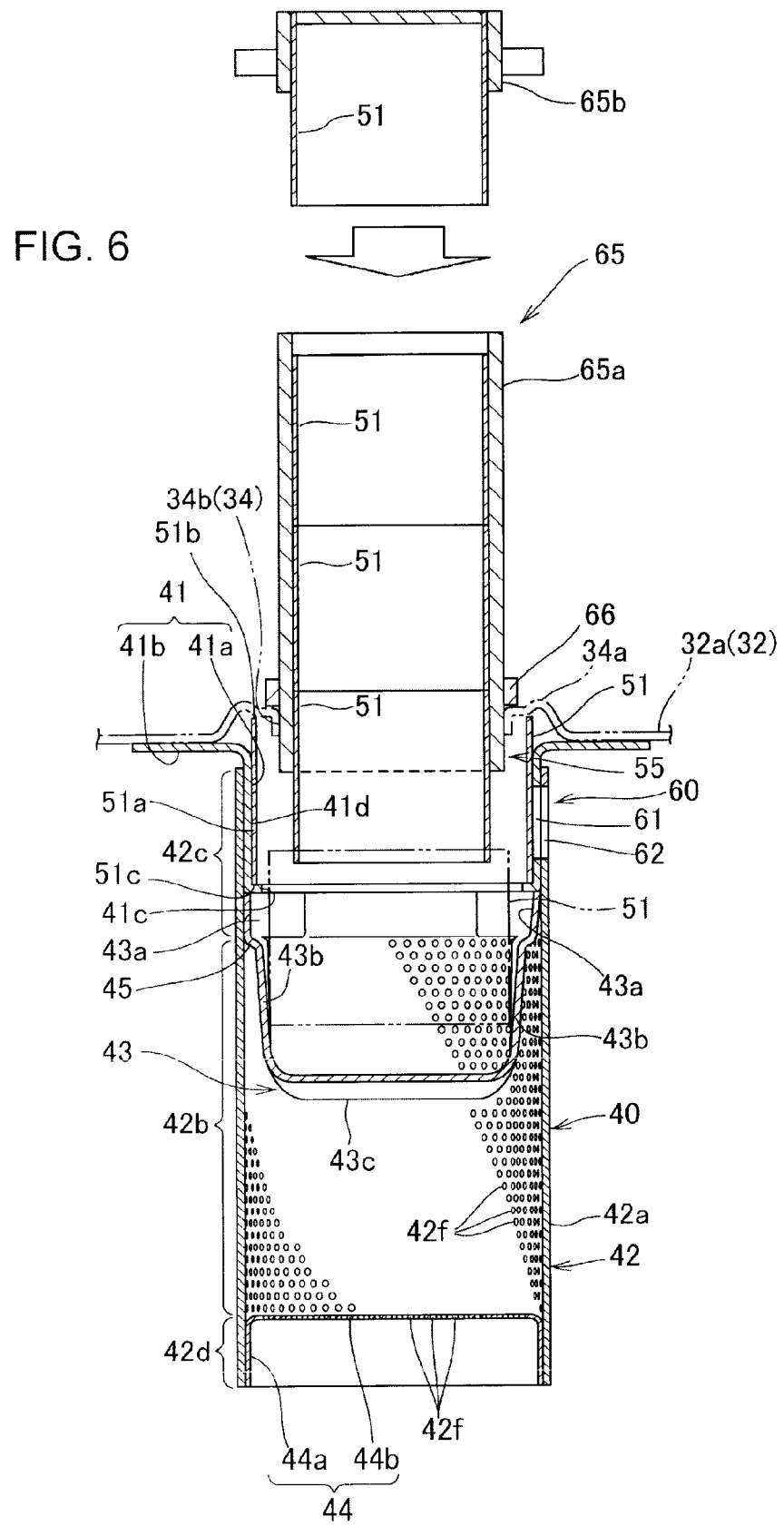
FIG. 6 is a side cross-sectional view showing the work for blocking a fuel bleeding opening with a cylindrical ring.

FIG. 6 is a side cross-sectional view showing the work for blocking the fuel bleeding opening 60 with the cylindrical ring 51. After completion of the fuel bleeding work, as shown in FIG. 6, the work of blocking the fuel bleeding opening 60 with the cylindrical ring 51 is performed using an assembling jig 65 (cylindrical assembling member).

The assembling jig 65 includes a guide cylinder 65a formed into a cylindrical shape and a cylindrical pressing cylinder 65b for pressing out the cylindrical ring 51. In the pressing cylinder 65b, the cylindrical ring 51 for pressing out the cylindrical ring 51 accommodated in the guide cylinder 65a is set.

The guide cylinder 65a has a length capable of accommodating a plurality of the cylindrical rings 51 in the axial direction, and the diameter of the outer peripheral part is formed smaller than the diameter A1 of the fuel feeding opening 34 so that the guide cylinder 65a can be inserted into the fuel filler port 55. On the outer peripheral surface in the lower part of the guide cylinder 65a, a flange part 66 projected in the radial direction is formed, and the insertion amount of the guide cylinder 65a into the fuel feed guiding cylinder 41 is restricted by abutting of the flange part 66 on the upper surface of the frame part 34a. The inside diameter of the guide cylinder 65a is formed smaller than the outside diameter of the cylindrical ring 51 in a state fitted to the inner peripheral surface 41d, and the cylindrical ring 51 is accommodated inside the guide cylinder 65a in a state reduced in diameter.

In the blocking work by the cylindrical ring 51, the worker inserts the lower part of the guide cylinder 65a in which the cylindrical rings 51 are set into the fuel filler port 55 to connect the guide cylinder 65a to the tank body 31, and thereafter presses out the cylindrical ring 51 inside the guide cylinder 65a downward by the pressing cylinder 65b. The pressed out cylindrical ring 51 falls to the inside of the fuel feed guiding cylinder 41 after being guided by the inner peripheral surface of the guide cylinder 65a, expands in diameter by a restoring force while falling, and is fitted to the inner peripheral surface of the supporting arm part 43b of the gun stopper body 43 as shown in the two-dot chain line in FIG. 6.

Next, the worker draws the cylindrical ring 51 upward using a tool and the like. Then, the cylindrical ring 51 drawn up to the fuel feed guiding cylinder 41 fits to the inner peripheral surface 41d while further expanding in diameter by the restoring force, whereby the fuel bleeding opening 60 is blocked by the cylindrical ring 51. Thus, invasion of a fire source through the fuel bleeding opening 60 can be prevented.

According to the first embodiment, the distance between the lower end of the inner peripheral wall part 34b of the frame part 34a and the upper surface of the inward folded part 41c is provided shorter than the axial length of the cylindrical ring 51; however it is arranged that the cylindrical ring 51 is made to fall to the inside of the fuel feed guiding cylinder 41, the ring upper end 51b is lowered beyond the lower end of the inner peripheral wall part 34b once, thereafter the cylindrical ring 51 is drawn up. Therefore, the cylindrical ring 51 can be fitted to the inner peripheral surface 41d.

Also, in the blocking work, since the gun stopper body 43 below the fuel feed guiding cylinder 41 includes the spanning part 43c and the fallen cylindrical ring 51 is prevented from dropping to the inside of the tank body 31 beyond and below the spanning part 43c, the workability of the blocking work can be improved.

Further, since the pair of supporting arm parts 43b are inclined so that the distance between the supporting arm parts 43b becomes smaller as it goes lower, the cylindrical ring 51 can be prevented from being tightly fitted to the supporting arm parts 43b with the entire outer peripheral surface 51a and the cylindrical ring 51 can be drawn up easily, whereby the workability of the blocking work can be improved.

As described above, according to the first embodiment to which the present invention is applied, even in the configuration the flame arrester 42 arranged inside the fuel filler port 55 of the fuel tank 26 is provided, the fuel inside the fuel tank 26 can be bled using the fuel bleeding opening 60 arranged in the peripheral wall part 41a of the cylindrical fuel feed guiding cylinder 41 and the flame arrester 42, and the fuel bleeding opening 60 can be blocked by the cylindrical ring 51 arranged so as to urge itself against the peripheral wall part 41a. Thus, the fuel tank structure capable of bleeding the fuel through the fuel filler port device 40 can be achieved with a simple structure, the fuel bleeding opening 60 can be blocked by the cylindrical ring 51, and the work of blocking the fuel bleeding opening 60 can be facilitated.

Also, since the cylindrical ring 51 is positioned by the frame part 34a with which the fuel filler port cap 35 is engaged, it is not necessary to arrange any part required only for positioning the cylindrical ring 51. Therefore, the cylindrical ring 51 can be arranged without increasing the number of components.

Further, because the strength of the lower end side of the fuel filler port device 40 can be improved by the inward folded part 41c formed at the lower end of the fuel feed guiding cylinder 41 of the fuel filler port device 40 and the cylindrical ring 51 can be positioned in the axial direction by the inward folded part 41c, the number of components can be reduced and the productivity can be improved.

Further, in assembling the cylindrical ring 51 to the fuel feed guiding cylinder 41, dropping of the cylindrical ring 51 to the inside of the fuel tank 26 can be restricted by the spanning part 43c of the gun stopper body 43 positioned lower than the lower end of the fuel feed guiding cylinder 41, and therefore the productivity can be improved.

Furthermore, since the cylindrical ring 51 is inserted into the fuel feed guiding cylinder 41 while being guided by the inner periphery of the assembling jig 65 connected to the fuel filler port 55 of the fuel filler port device 40, the assembling workability can be improved.

Also, since the cylindrical ring 51 is arranged above the flame arrester 42, the cylindrical ring 51 can be arranged without blocking the mesh part 42b of the flame arrester 42, and the fuel can be supplied from the fuel feeding opening 34 smoothly.

In addition, the first embodiment shows an aspect to which the present invention is applied, and the present invention is not to be limited to the first embodiment.

In the first embodiment, although the fuel feeding opening 60 was described to be constituted by the guide cylinder opening 61 and the arrester opening 62, the present invention is not limited to it, and for example, in a configuration in which the peripheral wall part 41a is not covered with the arrester peripheral part 42a, the fuel bleeding opening 60 can be formed only by arranging the guide cylinder opening 61 in the peripheral wall part 41a. Also, it is a matter of course that the detailed constitution of the motorcycle 1 can be changed arbitrarily.

Further, although the first embodiment was described using the motorcycle 1 which is a saddle-ride type vehicle as an example, the present invention can be applied to fuel tank structures of general purpose generators and agricultural machines as well.

Below, the second embodiment to which the present invention is applied will be described referring to FIG. 7. Parts constructed similar to those of the first embodiment in the second embodiment will be put with the same reference signs and description thereof will be omitted.

The second embodiment is different from the first embodiment in that the inward folded part 41c of the first embodiment is not arranged and the cylindrical ring 51 is positioned at the step part 45 of the gun stopper body 43.

Figure 7:
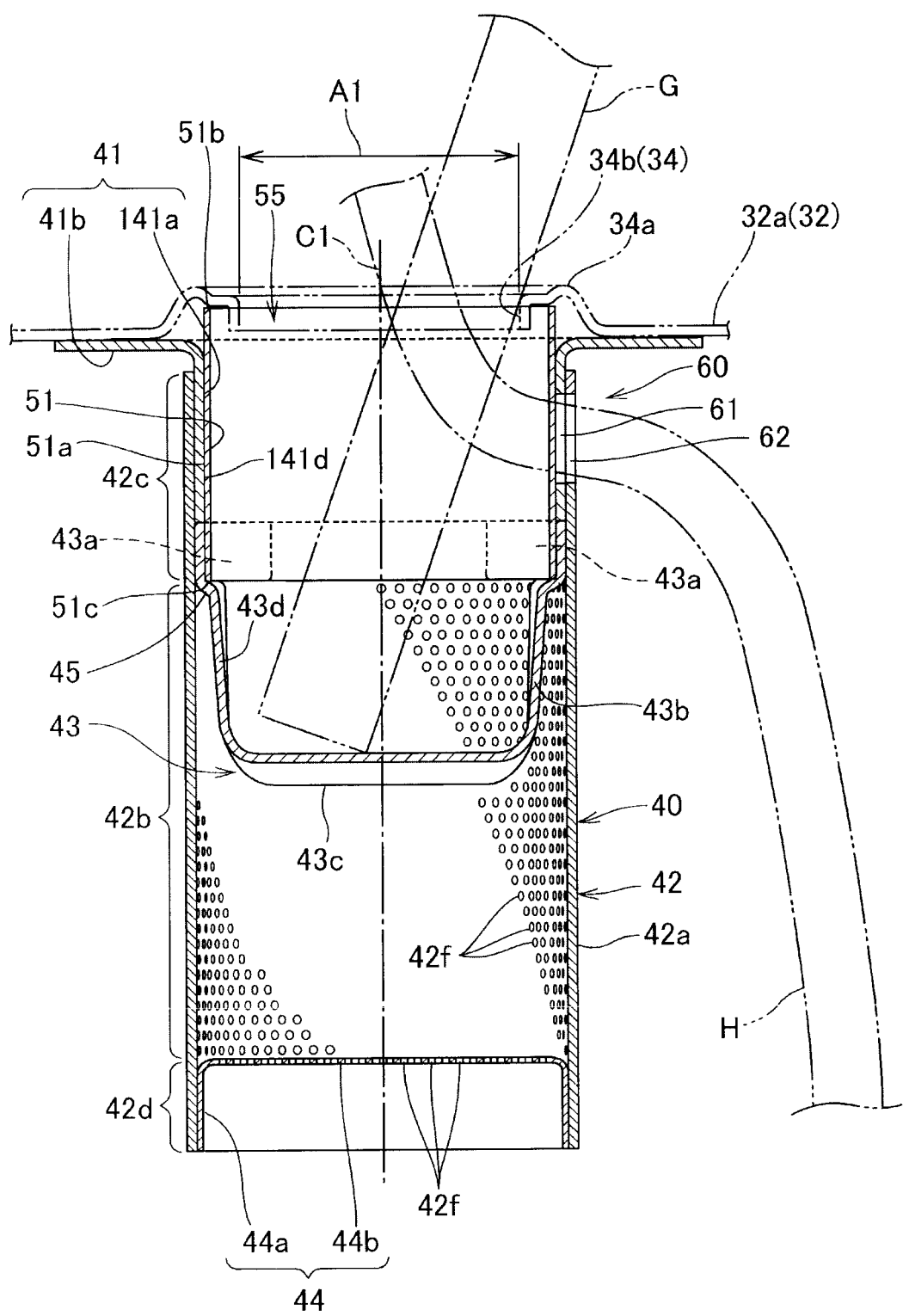
FIG. 7 is a cross-sectional view of a fuel filler port device in the second embodiment.

FIG. 7 is a cross-sectional view of the fuel filler port device 40 in the second embodiment.

As shown in FIG. 7, the fuel feed guiding cylinder 41 includes the flange part 41b and a cylindrical peripheral wall part 141a (side face part) continuing to the flange part 41b. In the peripheral wall part 141a, the guide cylinder opening 61 is formed.

The gun stopper body 43 is welded to the inner peripheral surface of the upper part 42c in a state the top edges of the joining sheet parts 43a abut on the lower end of the peripheral wall part 141a. The inner peripheral surface of the joining sheet parts 43a and the inner peripheral surface of the peripheral wall part 141a continue to each other and constitute an inner peripheral surface 141d to which the outer peripheral surface 51a of the cylindrical ring 51 is fitted.

In the cylindrical ring 51, the ring upper end 51b abuts on the inner surface of the frame part 34a and the ring lower end 51c abuts on the upper surface of the step part 45 of the gun stopper body 43. That is, the cylindrical ring 51 is positioned in the axial direction by the frame part 34a and the step part 45.

According to the second embodiment, the lower end 51c of the cylindrical ring 51 is positioned by the step part 45 of the gun stopper body 43; therefore it is not necessary to arrange any part required only for positioning the ring lower end 51c. Accordingly, the cylindrical ring 51 can be arranged without increasing the number of components.

Below, the third embodiment to which the present invention is applied will be described referring to FIG. 8 to FIG. 13. Parts constructed similar to those of the first embodiment in the third embodiment will be put with the same reference signs and description thereof will be omitted.

Figure 8:
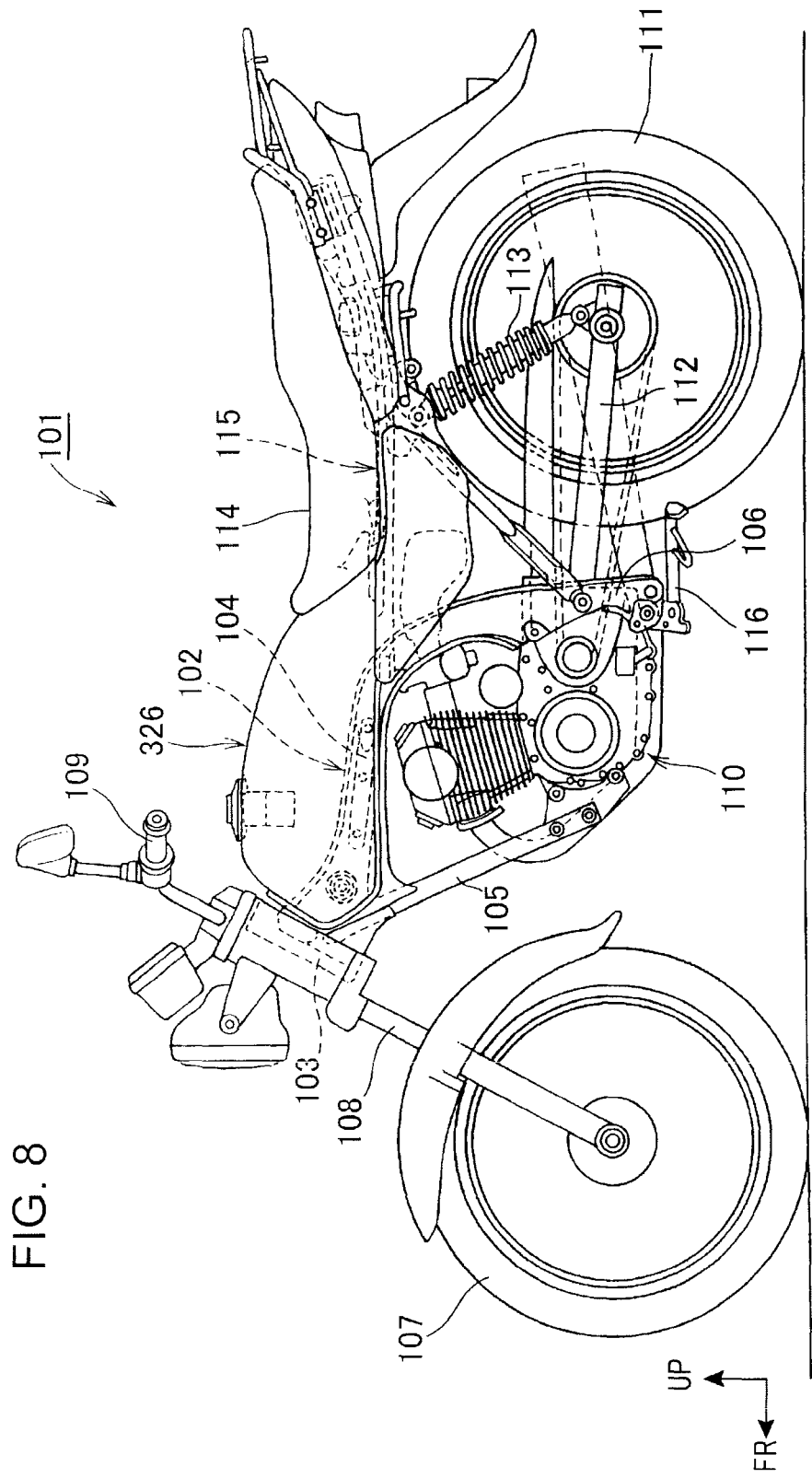
FIG. 8 is a left side view of a motorcycle to which is applied a fuel tank structure of the third embodiment.

FIG. 8 is a left side view of a motorcycle to which is applied a fuel tank structure of the third embodiment.

In a motorcycle 101 shown in FIG. 8, a vehicle body frame 102 thereof includes a head pipe 103 supporting a front wheel suspension system in a steerable manner, a main frame 104 extending rearward from the head pipe 103 and thereafter curvedly extending obliquely downward to the rear, a down tube 105 extending obliquely downward to the rear from the head pipe 103 and located below the main frame 104, right and left pivot plates 106 connected to the rear part of the main frame 104 and supporting rear swing arms 112 of a rear wheel suspension system in a vertically rockable manner, and a seat frame 115 extending rearward from the main frame 104.

Right and left front forks 108 are supported through the head pipe 103, and a front wheel 107 is supported by the lower ends of the front forks 108. A handlebar 109 for steering is arranged on the top of the front forks 108. An engine 110 is supported by a vehicle body frame 102, and a rear wheel 111 is supported by the rear part of rear swing arms 112. Rear cushions 113 are arranged between a seat frame 115 and the rear swing arms 112, and a seat 114 for occupants is supported by the seat frame 115. A side stand 116 for supporting the vehicle body of the motorcycle 101 in a standing state tilted to the left side is arranged at the bottom of the left pivot plate 106 and is disposed on the left side with respect to the center line of the vehicle body.

Figure 9:
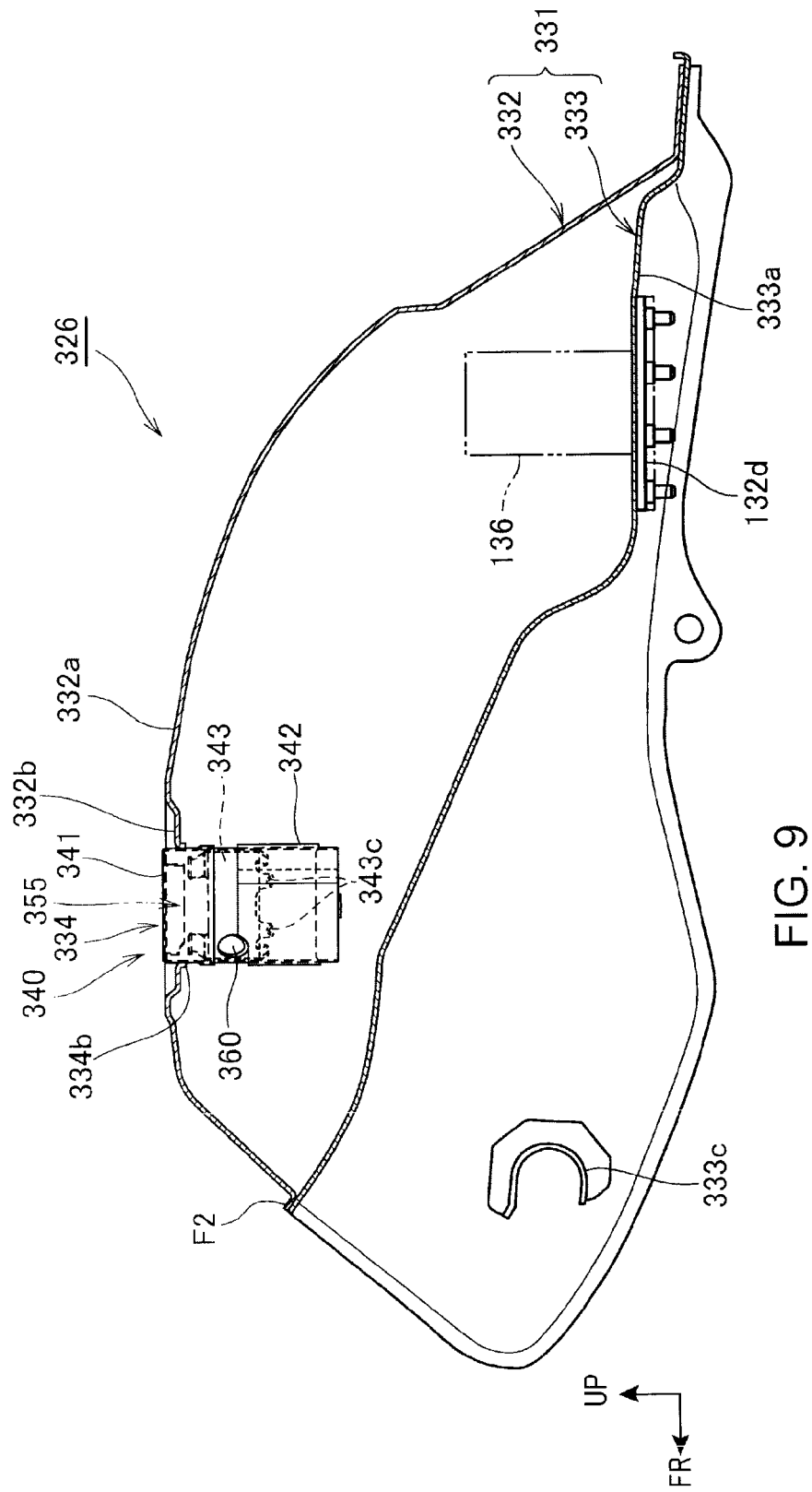
FIG. 9 is a side cross-sectional view of a fuel tank.
Figure 10:
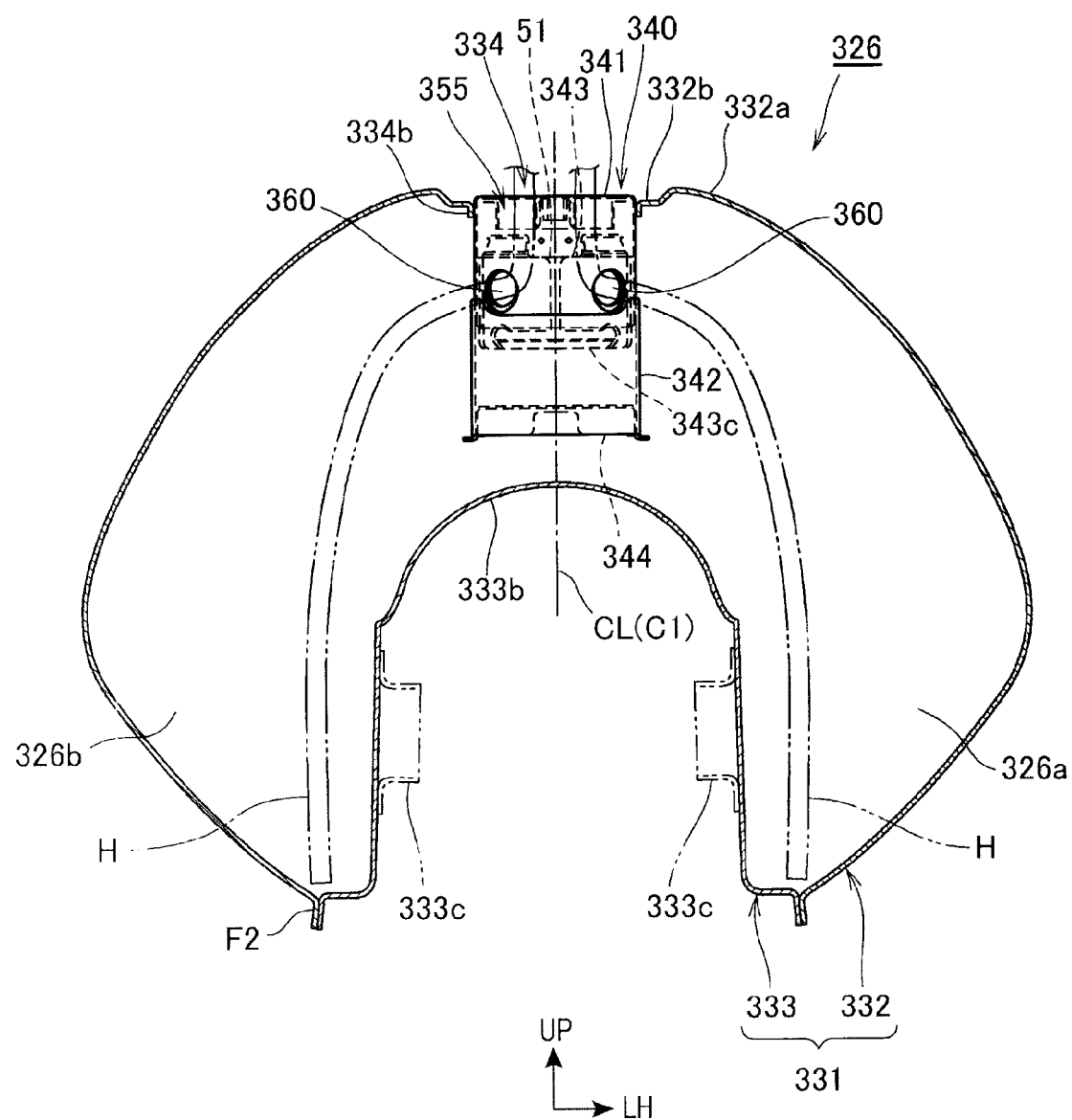
FIG. 10 is a front cross-sectional view of the fuel tank.

FIG. 9 is a side cross-sectional view of a fuel tank 326. FIG. 10 is a front cross-sectional view of the fuel tank 326.

The fuel tank 326 is arranged in front of the seat 114 (refer to FIG. 8) and is supported on the main frame 104. A saddle type tank body 331 of the fuel tank 326 includes an outer split body 332 forming the tank appearance and an inner split body 333 forming the inside part and the lower part, and is shaped hollow by integrally welding the outer split body 332 and the inner split body 333 through a flange F2 at the lower edge of the outer split body 332.

In the center of the lower part of the fuel tank 326 in the vehicle width direction, an escaping part 333b formed by making the upper split body 333 recess upward is formed, and the main frame 104 is made pass through the escaping part 333b. On the side faces of the escaping part 333b, connecting parts 333c connecting the fuel tank 326 to the main frame 104 are arranged.

The front part of the fuel tank 326 is partitioned into right and left chambers by the escaping part 333b, and in a state the fuel is less, the fuel is stored in a left chamber 326a and a right chamber 326b separately.

In the front part of an upper wall part 332a of the tank body 331, a flat part 332b recessed downward in a step shape is formed, and a tank upper face opening 334 circular in the top view is formed in the flat part 332b. The tank upper face opening 334 is arranged in the center of the tank body 331 in the vehicle width direction, and is positioned above the escaping part 333b.

In the peripheral edge part of the tank upper face opening 334, a cylindrical short flange 334b formed by bending the sheet of the upper wall part 332a downward inside the tank body 331 is formed.

In the rear part of a lower wall part 333a of the inner split body 333, a bracket 132d is arranged, and a fuel pump 136 is mounted through the bracket 132d.

The ethanol-containing fuel is stored in the fuel tank 326, and in the tank upper face opening 334 of the fuel tank 326, a filler port device 340 formed in a cylindrical shape and extending to the inside of the fuel tank 326 is arranged.

Figure 11:
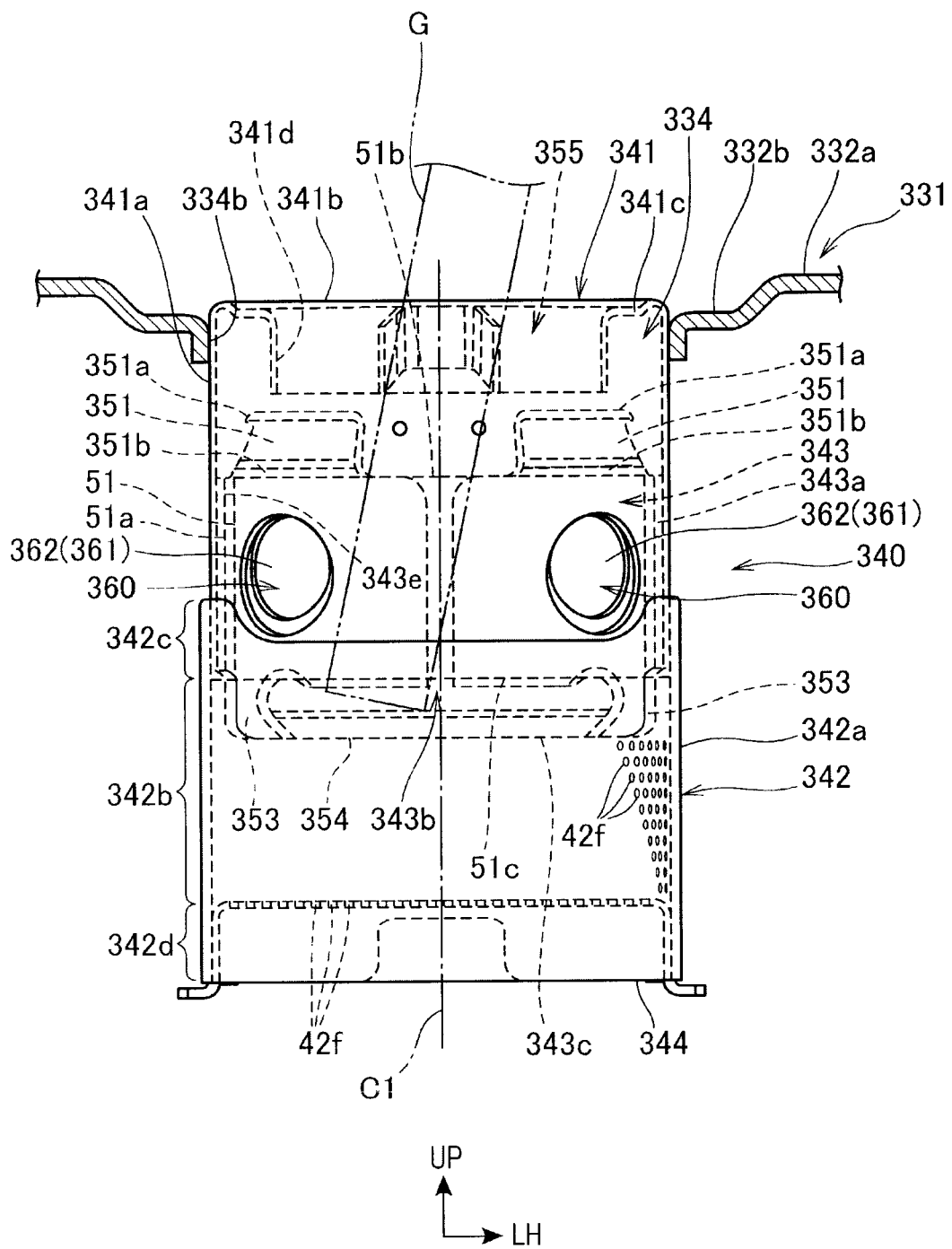
FIG. 11 is an enlarged view of a fuel filler port device in FIG. 10.
Figure 12:
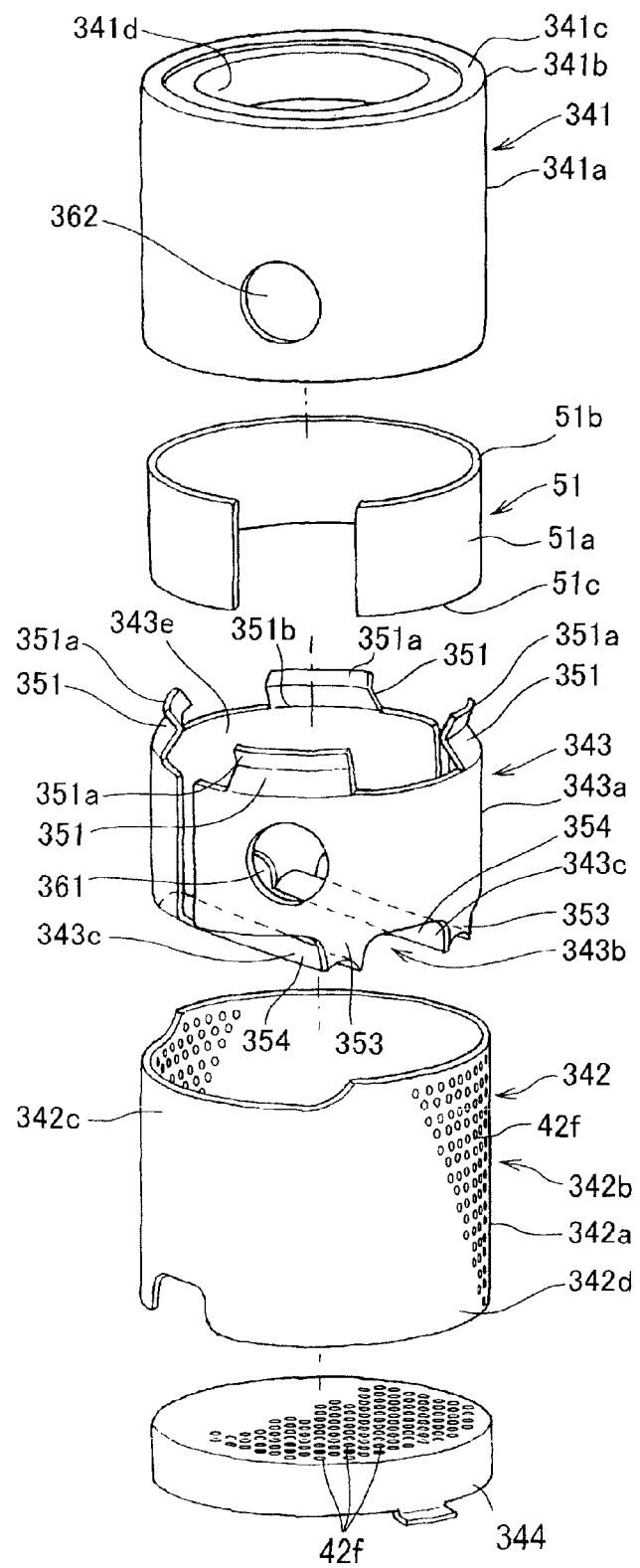
FIG. 12 is an exploded perspective view of the fuel filler port device.

FIG. 11 is an enlarged view of the fuel filler port device 340 in FIG. 10. FIG. 12 is an exploded perspective view of the fuel filler port device 340.

As shown in FIG. 11 and FIG. 12, the fuel filler port device 340 is configured to include a cylindrical filler metal 341 (filler metal member) continuing below the tank upper face opening 334 and extending to the inside of the tank body 331, a cylindrical gun stopper member 343 arranged inside the filler metal 341, a cylindrical flame arrester 342 arranged so as to cover the lower opening of the filler metal 341, and the cylindrical ring 51 (cylindrical spring sheet member) engaging with an inner peripheral surface 343e of the gun stopper member 343. The filler metal 341 and the gun stopper member 343 constitute a cylindrical fuel filler port 355 through which the nozzle G is inserted.

The filler metal 341 includes a filler peripheral wall part 341a coaxial with the tank upper face opening 334 and of a cylindrical shape and a frame part 341c formed at the top 341b of the filler metal 341. The frame part 341c includes a cylindrical inner peripheral wall part 341d formed by being downwardly folded back, and the inner peripheral wall part 341d extends downward to the inside of the tank body 331 along the fuel filler port axial line C1 extending generally in the vertical direction. The inside diameter of the inner peripheral wall part 341d becomes the inside diameter of the inlet of the fuel filler port 355 through which the nozzle G (refer to FIG. 11) of the fuel feed gun is inserted. A detachable fuel filler port cap (not shown) is attached to the frame part 341c.

The filler metal 341 is welded and fixed to the short flange 334b in a state the outer peripheral surface of the filler peripheral wall part 341a is fitted to the inner peripheral surface of the short flange 334b. More specifically, the filler metal 341 is fixed in a state the upper part 341b projects above the flat part 332b and is exposed to the outer side of the fuel tank 326.

Also, in the filler metal 341, circular filler openings 362 passing through the filler peripheral wall part 341a are formed. The filler openings 362 are formed in two locations in the lower part of the front side of the filler peripheral wall part 341a and to the right and left of a vehicle body center line CL (refer to FIG. 10).

The gun stopper member 343 is arranged in the lower part of the filler metal 341, restricts the insertion amount of the nozzle G of the fuel feed gun into the tank body 331, and prevents the nozzle G from contacting the flame arrester 42.

The gun stopper member 343 integrally includes a cylindrical stopper peripheral wall part 343a (cylindrical side face, side face part) extending along the inner peripheral surface of the filler peripheral wall part 341a, spanning parts 343c (gun stopper) arranged across a circular bottom open face 343b of the gun stopper member 343, and upper folded parts 351 (folded parts on the upper side) curving inward from the upper end of the stopper peripheral wall part 343a and extending upward.

The gun stopper member 343 is fixed to the filler metal 341 by fitting the outer peripheral surface of the stopper peripheral wall part 343a to the inner peripheral surface of the filler peripheral wall part 341a and in this state welding the fitted part.

The spanning parts 343c are formed in a bar shape perpendicular to the axial direction of the stopper peripheral wall part 343a, and two pieces of them are arranged in parallel with each other. More specifically, each spanning part 343c includes a pair of projected walls 353 projecting downward from the lower edge of the stopper peripheral wall part 343a and a bar part 354 extending between the lower ends of the pair of projected walls 353.

The upper folded parts 351 are arranged in four locations at generally equal intervals with each other in the peripheral direction of the stopper peripheral wall part 343a.

In the stopper peripheral wall part 343a, circular stopper openings 361 passing through the stopper peripheral wall part 343a are formed. The stopper openings 361 are formed in two locations corresponding to the respective filler openings 362, and communicate with the filler openings 362 in a state the gun stopper member 343 is fixed to the filler metal 341. In the filler port device 340, two fuel bleeding openings 360 (openings) are formed by aligning and communicating of the stopper openings 361 and the filler openings 362 with each other, whereby the fuel bleeding hose H can be inserted to each fuel bleeding opening 360.

The flame arrester 342 includes a cylindrical arrester peripheral wall part 342a and a cap member 344 blocking the lower end opening of the arrester peripheral wall part 342a.

The flame arrester 342 is fixed to the filler metal 341 by fitting of the inner peripheral surface of an upper part 342c of the arrester peripheral wall part 342a to the outer peripheral surface of the lower part of the filler peripheral wall part 341a and welding the fitted part.

The arrester peripheral wall part 342a is constructed of a sheet of perforated metal and includes a mesh part 342b in which a number of communication holes 42f are formed.

Also, the cap member 344 is arranged by shaping a sheet of perforated metal into a bottomed cylindrical shape opening downward and comparatively shallow in the vertical direction. A number of communication holes 42f are formed in the cap member 344, and the cap member 344 is formed into a mesh configuration. The cap member 344 is welded and fixed to the inner peripheral surface of a lower part 342d of the flame arrester 342.

As shown in FIG. 10, one fuel bleeding hose H is inserted into each fuel bleeding opening 360, and the fuel of the fuel tank 326 is bled through the fuel bleeding hose H. Each fuel bleeding opening 360 is blocked by the cylindrical ring 51 attached to the gun stopper member 343 after the bleeding work of the fuel by the fuel bleeding hose H.

Figure 13:
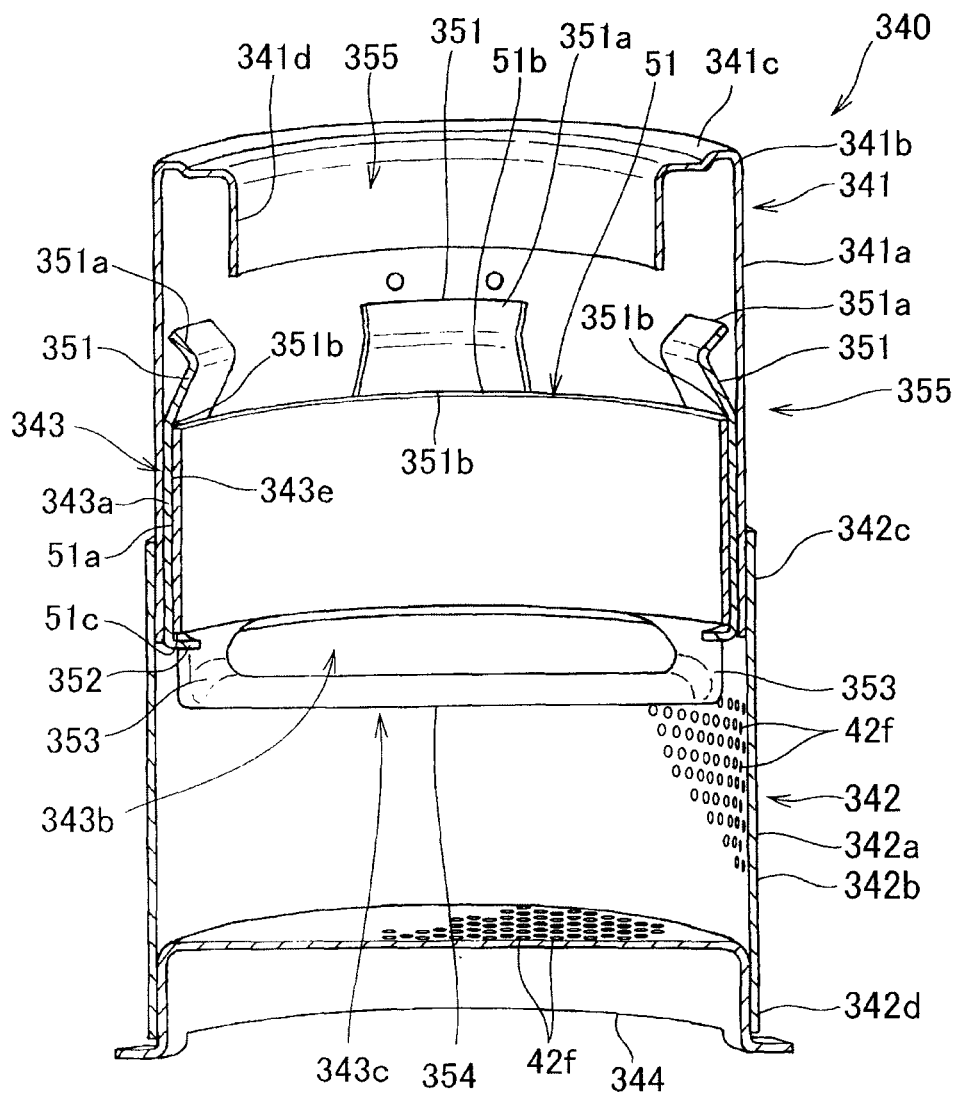
FIG. 13 is a cross-sectional view of the fuel filler port device.

FIG. 13 is a cross-sectional view of the fuel filler port device 340.

With reference to FIG. 11 to FIG. 13, the cylindrical ring 51 is assembled with the outer peripheral surface 51a being fitted to the inner peripheral surface 343e of the stopper peripheral wall part 343a, the cylindrical ring 51 in this state is reduced in diameter than a natural state, and the outer peripheral surface 51a urges the inner peripheral surface 343e to the direction pressingly expanding the inner peripheral surface 343e.

According to the present third embodiment, since each fuel bleeding opening 360 is blocked by the cylindrical ring 51 arranged so as to urge itself against the inner peripheral surface 343e, each fuel bleeding opening 360 can be blocked with a simple structure without using any fastening member and the like, and the work for blocking each fuel bleeding opening 360 can be facilitated.

As shown in FIG. 13, at the lower edge of the stopper peripheral wall part 343a, a lower folded part 352 formed by folding the sheet of the stopper peripheral wall part 343 inward in the axial direction is arranged. The lower folded part 352 continues in an arc shape along the lower edge of the stopper peripheral wall part 343a, and the upper surface part including the base end part at which the lower folded part 352 is folded becomes a support part on which the lower end of the ring 51 abuts.

The upper folded parts 351 extend upward and toward the inside in the radial direction from the upper edge of the stopper peripheral wall part 343a, are thereafter folded back outward in the radial direction in the middle parts, and include folding back parts 351a extending outward in the radial direction upward from the middle parts. Also, base end parts 351b at which the upper folded parts 351 are folded become support parts on which the ring upper end 51b abuts.

That is, in the upper and lower positions of the stopper peripheral wall part 343a, the upper folded parts 351 and the lower folded part 352 are arranged, and the cylindrical ring 51 is positioned in the vertical direction (in the axial direction) by being fitted between the upper folded parts 351 and the lower folded part 352.

Thus, since the cylindrical ring 51 is arranged so as to urge itself against the inner peripheral surface 343e, is positioned in the axial direction by the upper folded parts 351 and the lower folded part 352 and is tightly attached to the gun stopper member 343, the play of the cylindrical ring 51 due to the vibration and the like of the motorcycle 101 is prevented, and generation of the sound is prevented.

Also, since the upper folded parts 351 include the folding back parts 351a extending outward in the radial direction, even when the nozzle G of the fuel feed gun contacts the upper folded parts 351, the nozzle G is guided downward by the folding back parts 351a inclined downward to the inside. Therefore, catching of the nozzle G by the upper folded parts 351 can be prevented, and the workability of fuel feeding can be improved.

Further, the upper limit position of the fuel stored inside the fuel tank 326 agrees generally with the position of the lower folded part 352.

As shown in FIG. 10, in bleeding the fuel from the fuel tank 326, the fuel bleeding hose H is connected to each fuel bleeding opening 360. According to the present third embodiment, the respective fuel bleeding openings 360 are arranged to the right and left of the vehicle body center line CL corresponding to the left chamber 326a and the right chamber 326b; therefore the fuel bleeding hose H is allowed to easily reach the bottom of the fuel tank 326, and the fuel can be bled efficiently.

After completion of the bleeding work of the fuel, similarly to the first embodiment, the cylindrical ring 51 is assembled to the gun stopper member 343 with the assembling jig 65 (refer to FIG. 6) inserted into the fuel filler port 355. That is, the cylindrical ring 51 falls to the inside of the stopper peripheral wall part 343a after being guided by the inner peripheral surface of the guide cylinder 65a in a state reduced in diameter, the position is adjusted thereafter by the worker, and the cylindrical ring 51 is fitted to the inner peripheral surface 343e. At this time, since the spanning parts 343c are arranged below the stopper peripheral wall part 343a and the fallen cylindrical ring 51 is prevented from dropping to the inside of the tank body 331 below beyond the spanning parts 343c, the workability of the blocking work can be improved.

As described above, according to the third embodiment to which the present invention is applied, the cylindrical ring 51 is positioned in the axial direction by the upper folded parts 351 and the lower folded part 352 formed in the upper and lower positions of the stopper peripheral wall part 343a of the gun stopper member 343; therefore it is not necessary to arrange the part required only for positioning the cylindrical ring 51, and the cylindrical ring 51 can be arranged without increasing the number of components. Also, because the gun stopper member 343 having a comparatively complicated shape is arranged separately from the filler metal 341 and is welded to the filler metal 341, the productivity improves.

Further, since the folding back part 351a is formed in the upper folded part 351 formed in the gun stopper member 343, catching of the nozzle G by the upper folded part 351 can be prevented by the folding back part 351a in feeding the fuel, and the fuel feeding workability can be improved.

In addition, the third embodiment shows an aspect to which the present invention is applied, and the present invention is not to be limited to the third embodiment.

Figure 14:
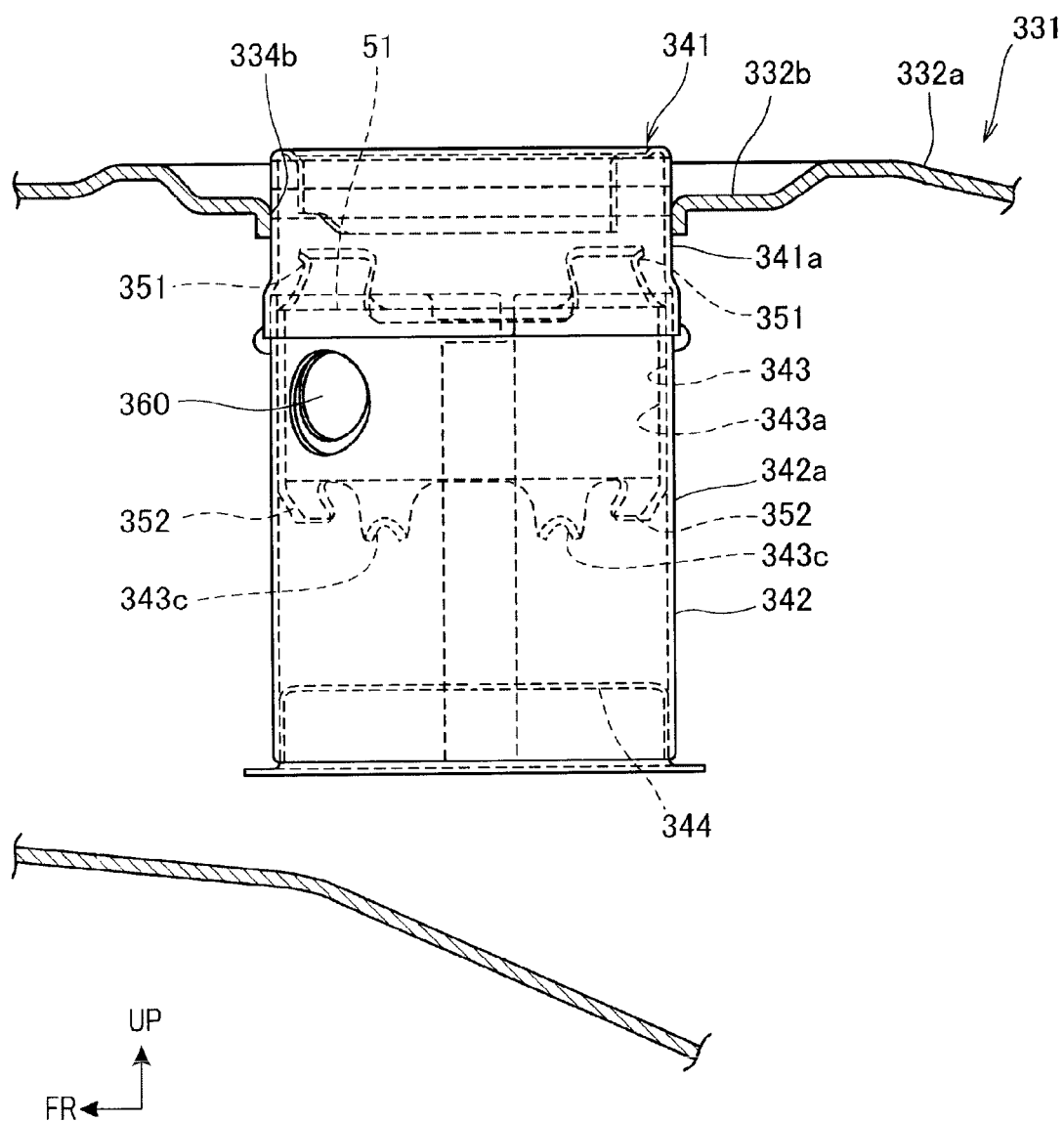
FIG. 14 is a side cross-sectional view of a fuel filler port device.

In the third embodiment, although the gun stopper member 343 was described to be fixed to the filler metal 341 by fitting the outer peripheral surface of the stopper peripheral wall part 343a to the inner peripheral surface of the filler peripheral wall part 341a and in this state welding the fitted part, the present invention is not limited to it. For example, as shown in the side cross-sectional view of the fuel filler port device of FIG. 14, the outer peripheral surface of the stopper peripheral wall part 343a may be fitted and welded to the inner peripheral surface of the arrester peripheral wall part 342a of the flame arrester 342, the outer peripheral surface of the upper part of the arrester peripheral wall part 342a may be thereafter fitted to the inner peripheral surface of the lower part of the filler peripheral wall part 341a, and the fitted part may be welded.

REFERENCE NUMBER LIST 26, 326 . . . Fuel tank
34a . . . Frame part (engaging part for fuel cap)
35 . . . Fuel filler port cap (fuel cap)
41 . . . Fuel feed guiding cylinder (tube part)
41a, 141a . . . Peripheral wall part (side face part)
41c . . . Inward folded part
42, 342 . . . Flame arrester
43 . . . Gun stopper body
51 . . . Cylindrical ring (cylindrical spring sheet member)
55 . . . Fuel filler port
60, 360 . . . Fuel bleeding opening (opening)
65 . . . Assembling jig (cylindrical assembling member)
341 . . . Filler metal (filler metal member)
343 . . . Gun stopper member
343a . . . Stopper peripheral wall part (cylindrical side face, side face part)
343b . . . Bottom open face
343c . . . Spanning part (gun stopper)
351 . . . Upper folded part (folded part, folded part on the upper side)
351a . . . Folded back part
352 . . . Lower folded part (folded part)
355 . . . Fuel filler port
G . . . Nozzle

What is claimed is:

1. A fuel tank structure comprising:
a fuel tank;
a fuel filler port formed in a cylindrical shape and arranged in the fuel tank; and a flame arrester arranged in the fuel filler port and disposed inside the fuel tank,
wherein an opening is formed in a side face part of the fuel filler port; and
a cylindrical spring sheet member is arranged and disposed so as to urge itself against the side face part of the fuel filler port and block the opening.

2. The fuel tank structure according to claim 1, further comprising:
a fuel cap engaged so as to block the fuel filler port,
wherein a fuel cap engaging part formed in the fuel filler port is formed so as to extend into the fuel tank and the fuel cap engaging part positions the cylindrical spring sheet member in an axial direction.

3. The fuel tank structure according to claim 1, wherein an inward folded part is formed at a lower end of a cylindrical part constituting the fuel filler port, and the inward folded part positions the cylindrical spring sheet member in an axial direction.

4. The fuel tank structure according to claim 2, wherein an inward folded part is formed at a lower end of a cylindrical part constituting the fuel filler port, and the inward folded part positions the cylindrical spring sheet member in the axial direction.

5. The fuel tank structure according to claim 3, wherein a gun stopper body for restricting invasion of a fuel feeding nozzle is arranged below a lower end of the fuel filler port.

6. The fuel tank structure according to claim 4, wherein a gun stopper body for restricting invasion of a fuel feeding nozzle is arranged below a lower end of the fuel filler port.

7. The fuel tank structure according to claim 1,
wherein the fuel filler port includes:
a filler metal member exposed toward outside the fuel tank and formed in a cylindrical shape; and
a cylindrical gun stopper member arranged inside the filler metal member, with the gun stopper member having a lower end including a gun stopper formed so as to extend across a lower open face of the gun stopper member,
wherein the opening is formed in a cylindrical side face of the gun stopper member, folded parts are formed at the top and bottom positions of the cylindrical side face, and the cylindrical spring sheet member is positioned in an axial direction by the folded parts.

8. The fuel tank structure according to claim 7, wherein the upper folded part formed in the gun stopper member has a folding back part formed thereon.

9. The fuel tank structure according to claim 1,
wherein the cylindrical spring sheet member is set on an inner periphery of a cylindrical assembling member whose inner diameter is smaller than an outer diameter of the cylindrical spring sheet member at rest and when said cylindrical spring sheet member is pressing against the cylindrical side part of the fuel filler port; and
the cylindrical spring sheet member is inserted into the fuel filler port while being guided by an inner periphery of the cylindrical assembling member connected to the fuel filler port.

10. The fuel tank structure according to claim 3,
wherein the cylindrical spring sheet member is set on an inner periphery of a cylindrical assembling member whose inner diameter is smaller than an outer diameter of the cylindrical spring sheet member at rest and when said cylindrical spring sheet member is pressing against the cylindrical side part of the fuel filler port; and
the cylindrical spring sheet member is inserted into the fuel filler port while being guided by an inner periphery of the cylindrical assembling member connected to the fuel filler port.

11. The fuel tank structure according to claim 2,
wherein the cylindrical spring sheet member is set on an inner periphery of a cylindrical assembling member whose inner diameter is smaller than an outer diameter of the cylindrical spring sheet member at rest and when said cylindrical spring sheet member is pressing against the cylindrical side part of the fuel filler port; and
the cylindrical spring sheet member is inserted into the fuel filler port while being guided by an inner periphery of the cylindrical assembling member connected to the fuel filler port.

12. The fuel tank structure according to claim 4,
wherein the cylindrical spring sheet member is set on an inner periphery of a cylindrical assembling member whose inner diameter is smaller than an outer diameter of the cylindrical spring sheet member at rest and when said cylindrical spring sheet member is pressing against the cylindrical side part of the fuel filler port; and
the cylindrical spring sheet member is inserted into the fuel filler port while being guided by an inner periphery of the cylindrical assembling member connected to the fuel filler port.

13. The fuel tank structure according to claim 6,
wherein the cylindrical spring sheet member is set on an inner periphery of a cylindrical assembling member whose inner diameter is smaller than an outer diameter of the cylindrical spring sheet member at rest and when said cylindrical spring sheet member is pressing against the cylindrical side part of the fuel filler port; and
the cylindrical spring sheet member is inserted into the fuel filler port while being guided by an inner periphery of the cylindrical assembling member connected to the fuel filler port.

14. The fuel tank structure according to claim 7,
wherein the cylindrical spring sheet member is set on an inner periphery of a cylindrical assembling member whose inner diameter is smaller than an outer diameter of the cylindrical spring sheet member at rest and when said cylindrical spring sheet member is pressing against the cylindrical side part of the fuel filler port; and
the cylindrical spring sheet member is inserted into the fuel filler port while being guided by an inner periphery of the cylindrical assembling member connected to the fuel filler port.

15. The fuel tank structure according to claim 1, wherein the cylindrical spring sheet member is arranged above the flame arrester.

16. The fuel tank structure according to claim 2, wherein the cylindrical spring sheet member is arranged above the flame arrester.

17. The fuel tank structure according to claim 6, wherein the cylindrical spring sheet member is arranged above the flame arrester.

18. The fuel tank structure according to claim 7, wherein the cylindrical spring sheet member is arranged above the flame arrester.

19. The fuel tank structure according to claim 9, wherein the cylindrical spring sheet member is arranged above the flame arrester.

20. The fuel tank structure according to claim 14, wherein the cylindrical spring sheet member is arranged above the flame arrester.

* * * * *